(12) United States Patent
Katoh et al.

(10) Patent No.: US 7,958,135 B2
(45) Date of Patent: Jun. 7, 2011

(54) INFORMATION PROCESSING APPARATUS, INFORMATION RECORDING SYSTEM, INFORMATION RECORDING METHOD, AND COMPUTER-READABLE MEDIUM STORING PROGRAM

(75) Inventors: Masayoshi Katoh, Kanagawa (JP); Soichiro Iga, Tokyo (JP); Tetsuro Nagatsuka, Kanagawa (JP); Eiji Kemmochi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1055 days.

(21) Appl. No.: 11/516,857

(22) Filed: Sep. 6, 2006

(65) Prior Publication Data

US 2007/0051793 A1 Mar. 8, 2007

(30) Foreign Application Priority Data

Sep. 6, 2005 (JP) .................................. 2005-257644

(51) Int. Cl.
*G06F 17/30* (2006.01)
(52) U.S. Cl. ......................... 707/758; 707/951
(58) Field of Classification Search .................. None
See application file for complete search history.

(56) References Cited

U.S. PATENT DOCUMENTS

| | | | |
|---|---|---|---|
| 7,502,606 B2 * | 3/2009 | Flynt et al. .................... 455/403 |
| 2002/0135801 A1 * | 9/2002 | Tessman et al. ............. 358/1.15 |
| 2006/0259511 A1 * | 11/2006 | Boerries et al. .......... 707/103 R |

FOREIGN PATENT DOCUMENTS

| | | |
|---|---|---|
| JP | 2000-341569 | 12/2000 |
| JP | 2003-91487 | 3/2003 |
| JP | 2003-67311 | 9/2003 |
| JP | 2004-229021 | 8/2004 |
| JP | 2005-5953 | 1/2005 |

* cited by examiner

*Primary Examiner* — Hung Q Pham
(74) *Attorney, Agent, or Firm* — Cooper & Dunham LLP

(57) ABSTRACT

An information processing apparatus is disclosed that that acquires image/audio information in response to an operations command and generates predetermined electronic data from the acquired information. The information processing apparatus includes a user information storing unit that stores and manages information for identifying an operator issuing the operations command, a personal information storing unit that stores and manages personal information of the operator, a gathering information storing unit that stores or describes a personal information managing service managing personal information that is subject to processing, and an information extracting unit that analyzes the personal information managing service of the gathering information storing unit and extracts relevant personal information from the personal information of the operator stored in the personal information storing unit corresponding to the personal information managing service.

19 Claims, 17 Drawing Sheets

FIG.3A

| SCHEDULE |
|---|
| MAIL |
| ADDRESS |
| GPS |
| ⋮ |

FIG.3B

| INFORMATION CATEGORY 1 | INFORMATION CATEGORY 2 | ... |
|---|---|---|
| SCHEDULE | SCHEDULE | |
| ADDRESS | MAIL | |
| | ADDRESS | |
| | GPS | |
| ⋮ | ⋮ | |

FIG. 7

PIM APPLICATION — 60

| | MON. | TUE. | WED. | THU. | FRI. | SAT. | SUN. |
|---|---|---|---|---|---|---|---|
| | | | MARCH | | | | 2005 |
| | | 1 | 2 DEMONSTRATION | 3 | 4 | 5 | 6 | 7 DATE |
| | 8 | 9 | 10 | 11 BUSINESS NEGOTIATION | 12 | 13 | 14 |
| | 15 | 16 | 17 MEETING | 18 | 19 | 20 | 21 |
| | 22 | 23 TOUR | 24 | 25 | 26 | 27 | 28 |
| | 29 | 30 | | | | | |

3/17 (WED) 13:00-17:00 SUBJECT:MEETING LOCATION:OFFICE A CONFERENCE ROOM 1
IMAGE> file:¥¥PC_server1¥User1¥Images¥Images1.jpg
HANDOUT> file:¥¥PC_server1¥User1¥Doc¥Presen1.doc

— 61

SCHEDULE
WORK
CONTACTS

FIG. 15

| IMAGE DATA | ACQUISITION RESULT |
|---|---|
| AAAA.jpg | MEETING OFFICE A CONFERENCE ROOM1 |
| AAAA.jpg | UserA@abc.def.gh |

FIG. 16

| IMAGE FILE NAME | SEARCH KEY | ACQUISITION SERVICE | REFERENCE INFORMATION |
|---|---|---|---|
| AAAA.jpg | 2006/02/12 | GetOutlookScheduleData | File://abc.def.gh.ij/outlook |
| AAAA.jpg | 2006/02/12 | GetNotesMailAddressData | File://abc.def.gh.ij/Lotus/notes |
| ----.jpg | ... | ... | ... |

INFORMATION PROCESSING APPARATUS, INFORMATION RECORDING SYSTEM, INFORMATION RECORDING METHOD, AND COMPUTER-READABLE MEDIUM STORING PROGRAM

BACKGROUND

1. Technical Field

This disclosure relates generally to an information processing apparatus, an information recording system, an information recording method, and a computer-readable medium storing a program, and particularly to a technique for automatically assigning relevant information to data such as image data, video data, or audio data that are stored and managed in an information processing apparatus so that reuse of the stored data may be facilitated.

2. Description of the Related Art

Conventionally, an image captured by a digital camera may be stored as an image file in a relatively small-capacity storage medium that is installed in the digital camera. Then, the image file may be forwarded to a personal computer (PC) by a user to be stored in a hard disk, for example.

Image data of such image files may be stored in the same directory in time sequential order, or the user may create directories according to image data contents using image management software and select the storage destination for each set of image data so that image data may be stored in time sequential order in each of the directories.

Japanese Laid-Open Patent Publication No. 2000-341569 discloses storing relevant information such as character data or audio data along with image data in the recording medium of a digital camera, or linking the image data to such relevant information.

Also, Japanese Laid-Open Patent Publication No. 2005-5953 discloses a technique for generating JPEG (Joint Photographic Experts Group) image data by acquiring map information (e.g., location name or name of a nearby facility) that may be acquired from current position information provided by a communication system such as a GPS (Global Positioning System), and inserting the map information data in a predetermined area of Exif (Exchangeable image file format) data.

In recent years and continuing, high-definition digital cameras are installed in portable information terminals such as the mobile phone and the PDA (Personal Digital Assistant) so that such digital cameras may be used as note pads for recording information on the spot in various circumstances such as at work.

In the case of recording such work-related information (e.g., image data) in the manner described above, even the user that has recorded the image data may not necessarily remember the contents of the stored image data and the storage destination thereof so that the stored image data may not be accurately accessed, for example.

Also, in the case of searching the storage destination of desired image data, the user may have to check the contents of each image data file one by one so that the procedure may take more time as the number of stored image data files is increased to thereby create a burden on the user.

It is noted that information acquired during work may in some way be associated with PIM (Personal Information Manager) information such as schedule information, work information, or contact information that is stored and managed by an individual.

Accordingly, by associating acquired information with such PIM information, the acquired information may be referenced based on the PIM information so that reuse of the acquired information may be facilitated.

SUMMARY

According to an aspect of this disclosure, a technique is provided for gathering peripheral information (so-called context information) and associating the peripheral information with acquired information that is to be stored in an information processing apparatus so that reuse of the acquired information may be facilitated and usability may be improved.

In an exemplary embodiment, an information processing apparatus is provided that acquires image/audio information in response to an operations command and generates predetermined electronic data from the acquired information, the apparatus including:

a user information storing unit that stores and manages information for identifying an operator issuing the operations command;

a personal information storing unit that stores and manages personal information of the operator;

a gathering information storing unit that stores or describes a personal information managing service managing personal information that is subject to processing; and an information extracting unit that analyzes the personal information managing service of the gathering information storing unit and extracts relevant personal information from the personal information of the operator stored in the personal information storing unit corresponding to the personal information managing service.

In one preferred embodiment, at least one of the user information storing unit, the personal information storing unit, and the gathering information storing unit is provided in an external information processing apparatus that is configured to be recognized via communication.

In another preferred embodiment, the gathering information storing unit includes reference information for accessing the personal information managing service, and the information extracting unit determines whether the relevant personal information is included in the personal information of the operator stored in the personal information storing unit.

In another preferred embodiment, the information processing apparatus of the present invention further includes:

a relevant information generating unit that associates all or a portion of the relevant personal information extracted by the information extracting unit with the electronic data.

In another preferred embodiment, the relevant information generating unit stores all or a portion of the extracted relevant personal information as relevant recording information, and embeds reference information for accessing the stored relevant recording information in meta information of the electronic data.

In another preferred embodiment, the relevant information generating unit embeds all or a portion of the extracted personal relevant information in meta information of the electronic data.

In another preferred embodiment, the information processing apparatus of the present invention further includes:

an information adding unit that adds the relevant recording information to the electronic file when the relevant personal information is acquired.

In another preferred embodiment, the information processing apparatus of the present invention further includes:

a meta information erasing unit that erases at least one portion of the meta information when the electronic data are to be distributed.

According to another exemplary embodiment of the present invention, an information recording system is provided that includes:

an information processing terminal that acquires image/audio information in response to an operations command and generates predetermined electronic data from the acquired information;

an information processing apparatus that receives the electronic data from the information processing terminal and stores the received electronic data; and a network that interconnects the information processing terminal and the information processing apparatus; wherein the information processing terminal includes a user information storing unit that stores and manages information for identifying an operator issuing the operations command, a gathering information storing unit that stores or describes a personal information managing service managing personal information that is subject to processing, and a forwarding unit that transmits the information for identifying the operator, the electronic data, and the personal information managing service to the information processing apparatus; and the information processing apparatus includes a receiving unit that receives the information for identifying the operator, the electronic data, and the personal information managing service from the information processing terminal, a personal information storing unit that stores and manages personal information of the operator, and an information extracting unit that analyzes the personal information managing service received from the information processing terminal and acquires relevant personal information from the personal information of the operator stored in the personal information storing unit.

In a preferred embodiment, at least one of the user information storing unit, the personal information storing unit, and the gathering information storing unit is provided within the information processing terminal or an external information processing apparatus that is configured to be recognized by the information processing terminal via communication.

In another preferred embodiment, the gathering information storing unit includes reference information for accessing the personal information managing service, and the information extracting unit determines whether the relevant personal information is included in the personal information of the operator stored in the personal information storing unit.

In another preferred embodiment, the information processing apparatus further includes a relevant information generating unit that associates all or a portion of the relevant personal information extracted by the information extracting unit with the electronic data.

In another preferred embodiment, the relevant information generating unit stores all or a portion of the extracted relevant personal information as relevant recording information, and embeds reference information for accessing the stored relevant recording information in meta information of the electronic data.

In another preferred embodiment, the relevant information generating unit embeds all or a portion of the extracted personal relevant information in meta information of the electronic data.

In another preferred embodiment, the information processing apparatus further includes an information adding unit that adds the relevant recording information to the electronic file when the relevant personal information is acquired.

In another preferred embodiment, the information processing apparatus further includes a meta information erasing unit that erases at least one portion of the meta information when the electronic data are to be distributed.

According to another exemplary embodiment, an information recording method is provided for acquiring image/audio information in response to an operations command, generating predetermined electronic data from the acquired information, and recording the generated electronic data, the method including the steps of:

storing and managing user information for identifying an operator issuing the operations command and personal information of the operator within a personal information managing unit;

storing or describing a personal information managing service managing personal information that is subject to processing within a gathering information storing unit;

analyzing the personal information managing service of the gathering information storing unit;

acquiring relevant personal information from the personal information of the operator stored in the personal information storing unit; and associating all or a portion of the acquired relevant personal information with the electronic data.

In one preferred embodiment, when the relevant personal information is acquired, all or a portion of the acquired relevant personal information is stored in an information managing unit as relevant recording information, and reference information for accessing the stored relevant recording information is added to the information managing unit.

According to another exemplary embodiment, a computer-readable medium is provided that stores a program for acquiring image/audio information in response to an operations command, generating predetermined electronic data from the acquired information, and recording the generated electronic data, which program is run on a computer and is executed by the computer to perform the information recording method according to an embodiment of the present invention or the functions of the information processing apparatus or the information recording system according to an embodiment of the present invention.

According to another aspect of this disclosure, in the case of storing acquired information in an information processing apparatus, peripheral information describing the circumstances under which the acquired information has been acquired (i.e., so-called context information) may be automatically assigned to the acquired information as meta information so that reuse of the acquired information may be facilitated and usability may be improved.

According to another aspect of this disclosure, a data storing technique is provided that is suitably adapted for effectively triggering the recollection of the user with respect to acquired information when the acquired information is referenced later on, categorizing the acquired information, and enabling user-friendly data manipulation.

BRIEF DESCRIPTION OF THE DRAWINGS

FIGS. 3A and 3B are tables illustrating exemplary data stored in a gathering information storing unit;

FIG. 7 is a diagram showing an exemplary display where an item of a schedule managing application is linked to an image data file;

FIG. 15 is a table illustrating acquired relevant information stored as a temporary file;

FIG. 16 is a table illustrating a personal information managing service list;

DESCRIPTION OF THE PREFERRED EMBODIMENTS

Figure 1:
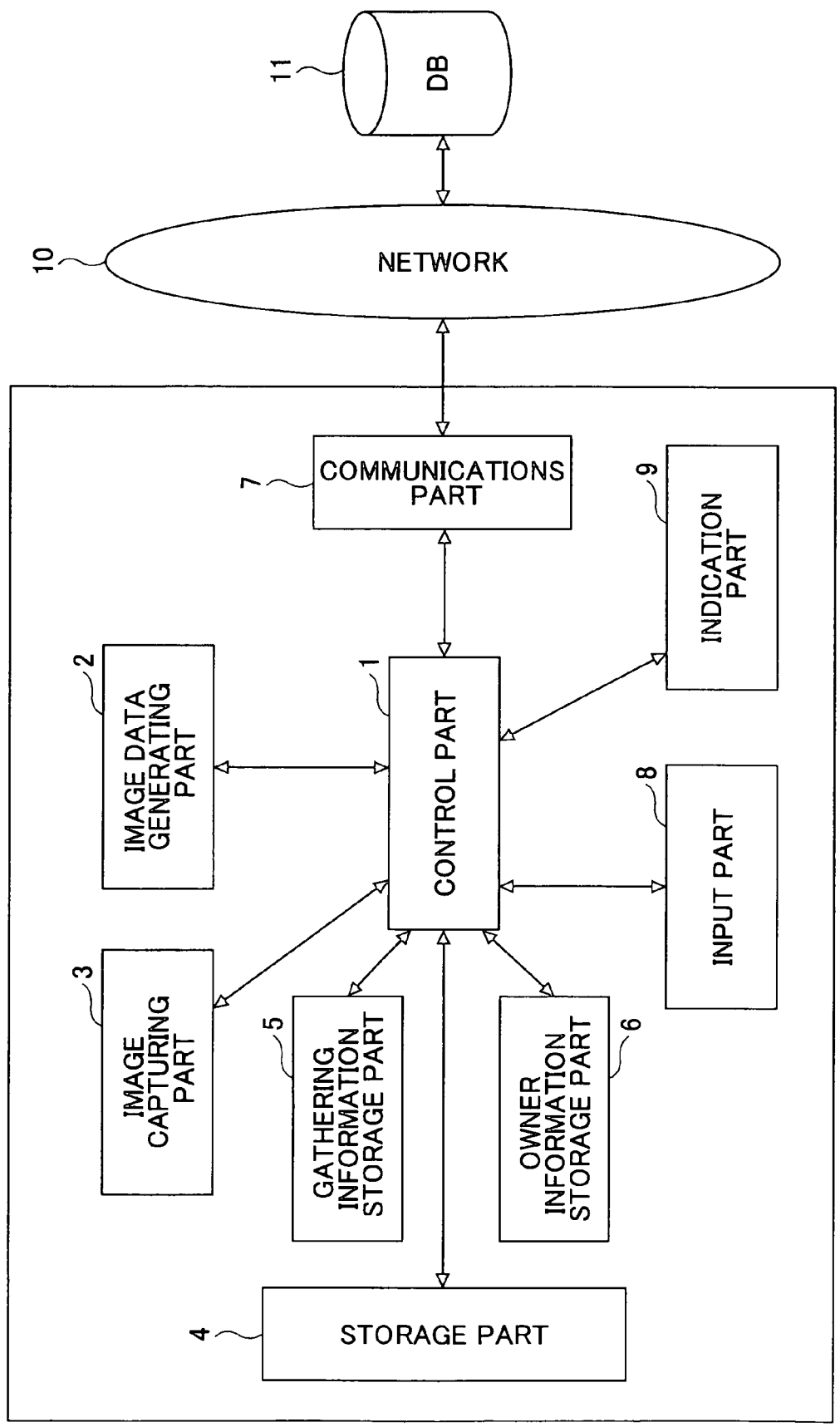
FIG. 1 is a block diagram showing an overall configuration of an information processing apparatus according to a first embodiment of the present invention.

In the following, preferred embodiments of the present invention are described with reference to the accompanying drawings.

(A) OVERVIEW

Embodiments of the present invention relate to listing personal information managing services from which relevant personal information is to be gathered upon electronically recording real world information such as a still image, a moving image, or audio; acquiring the relevant personal information by referring to the list, and associating or embedding the acquired relevant personal information as relevant meta information with/in the recording information so that reuse of image data (recording information) such as calling the acquired image from a PIM application or image searching using PIM data may be facilitated.

(A-1) Recording Acquired Information in the Same Information Processing Apparatus that has Acquired the Information An information processing apparatus with functions of recording a still image, a moving image, or audio (e.g., digital camera, video camera, or information terminals such as a mobile phone or PDA having camera functions) may be configured to acquire personal information (e.g., so-called PIM information including schedule information, address book information, work information, mail information; and position information obtained by a sensor including GPS information and RFID (Radio Frequency Identification) tags) via a tool group used by individual users to manage their personal information.

For example, PIM software is generally installed in a portable information terminal such as a PDA or a mobile phone that is equipped with a camera. In such a terminal apparatus, personal information (e.g., schedule, address book, work information, main information, etc.) may be managed in the memory of the terminal apparatus. In another example, the information processing apparatus may acquire personal information that is provided over a network by a service provider.

It is noted that personal information such as schedule information may be information on activities planned by an individual; in another aspect, the information may be regarded as state transition information of an individual with respect to time.

In this regard, it may be assumed that the act of acquiring an image or recording audio in place of taking notes while the user is at work may have some correlation with the schedule information of the user at the time such image/audio is acquired.

Accordingly, upon recording a still image, a moving image, or audio, user information (information for identifying a user) and an information list describing the information subjects from which relevant information is to be gathered (personal information managing service list) may be created on the spot or stored in advance, and the user information and the personal information managing service list of personal information managing services may be referenced to extract personal information data of a desired item of the items included in the personal information as relevant item information. Then, stored data corresponding to managed items of the personal information managing service such as location information or item name information may be referenced from the extracted relevant item information and described in a predetermined data format as relevant personal information of the acquired recording information. The relevant personal information may be arranged into a file and recorded in the information processing apparatus.

Further, a keyword of data contents or a file name of relevant data may be described and stored in the meta information storage area of recording data as a peripheral information keyword for acquired recording data or a link to the relevant data file. The keyword or link may be embedded in a recording data file of acquired information such as an image and recorded in the information processing apparatus.

In this way, acquired personal information may be used for meta information searching within a file by a management application for managing recording data so that peripheral information that can be recognized by a user may be recorded along with time/date information and image information.

(A-2) Recording Acquired Information in an Information Processing Apparatus Connected Via a Network In the case where information acquired by an information processing device with functions of recording a still image, a moving image, or audio is transmitted to and recorded in an information processing apparatus that is connected to the device via a network, the information processing apparatus is configured to acquire relevant personal information managed over the network via a tool group that is used by individual users to manage their personal information.

Upon recording an image or audio that is transmitted thereto, the information processing apparatus as is described above may acquire user information (information for identifying a user) and a personal information managing service list that lists information subjects from which relevant information is to be gathered (the information may alternatively be stored beforehand), refer to the user information and the personal information managing service list, and extract data of a predetermined item of the items stored in the personal information as relevant item information. Further, stored data corresponding to managed items of the personal information managing service such as location information and item name information may be referenced from the extracted relevant item information and described in a predetermined data format as relevant personal information of the acquired recording information. The relevant personal information may be arranged into a file and recorded in the information processing apparatus.

Further, a keyword of data contents or a file name of relevant data may be described and stored in the meta information storage area of recording data as a peripheral information keyword for acquired recording data or a link to the relevant data file. The keyword or link may be embedded in a recording data file of acquired information such as an image and recorded in the information processing apparatus.

(B) SPECIFIC EMBODIMENTS

First Embodiment

In the following, a device for personal use such as a PDA that is configured to acquire media data (e.g., still image data, moving image data, audio data, etc.) is described as an information processing apparatus according to a first embodiment of the present invention. It is noted that in the following descriptions, the term media data file is used to describe media data that are arranged into a file.

Also, in the following descriptions, it is assumed that Exif data are used as the data format for storing relevant personal information for a still image. However, applications of the present invention are not limited to use of such a data format, and the present invention may be realized using any data format that has a meta information storage area capable of describing main data and peripheral information pertaining to the main data (e.g., image capturing condition information, manufacturer information, format information) wherein the meta information storage area includes an area in which the user may freely write information.

Also, it is noted that the above-described data storing functions may be provided in a multifunction apparatus such as an MFP with scanning, copying, and printing capabilities rather than a PDF, for example.

FIG. 1 is a block diagram showing an overall configuration of an information processing apparatus according to the first embodiment. As is shown in this drawing, the information processing apparatus of the present embodiment includes a control part 1; an image data generating part 2 that generates an image data file from captured/acquired image data and stores the image data file in a storage part 4; an image capturing part 3 that captures an image of an object; the storage part 4 that stores the generated image data file, control programs for controlling the present apparatus, and setting information for capturing an image; a gathering information storage part 5 that stores information subjects representing personal information managing services from which relevant personal information to be stored in an image data file may be acquired (e.g., name of a PIM service that manages personal information); an owner information storage part 6 as an embodiment of a user information storing unit that stores owner information pertaining to the owner (user) of the present apparatus, a communications part 7 that establishes communication with an external unit such as a database 11 or another information processing apparatus connected to the present apparatus via a network 10 in a case where the relevant personal information is stored in such an external unit; an input part 8 including keys and buttons for inputting data and commands; and an indication part 9 for indicating guide screens, captured images, and processing results, for example.

It is noted that in an alternative embodiment, the relevant personal information may be stored in the storage part 4 of the present apparatus.

According to the present embodiment, an image data file created based on image data of an image captured by the image capturing part 3 is stored in the storage part 4. In this case, additional information related to the captured/acquired image data such as time/date information representing the time/date the image has been captured, location information representing the location at which the image has been captured, capture setting information representing the settings used in capturing the image, and image data file address information representing the storage address of the image data file within the storage part 4 may be recorded in a meta information storage area of the image data file.

Specifically, when the generated image data file is to be stored or when an image data file is designated by the input part 8, the image data file, the gathering information storage part 5, and the owner information storage part 6 may be referenced, and relevant personal information searched and extracted from personal information may be arranged into a temporary file to be recorded in the storage part 4 in association with the image data file. It is noted that the relevant personal information may be associated with the image data file by recording the temporary file address information representing the storage location of the temporary file within the storage part 4 in the meta information storage area of the image data file, for example.

Figure 2:
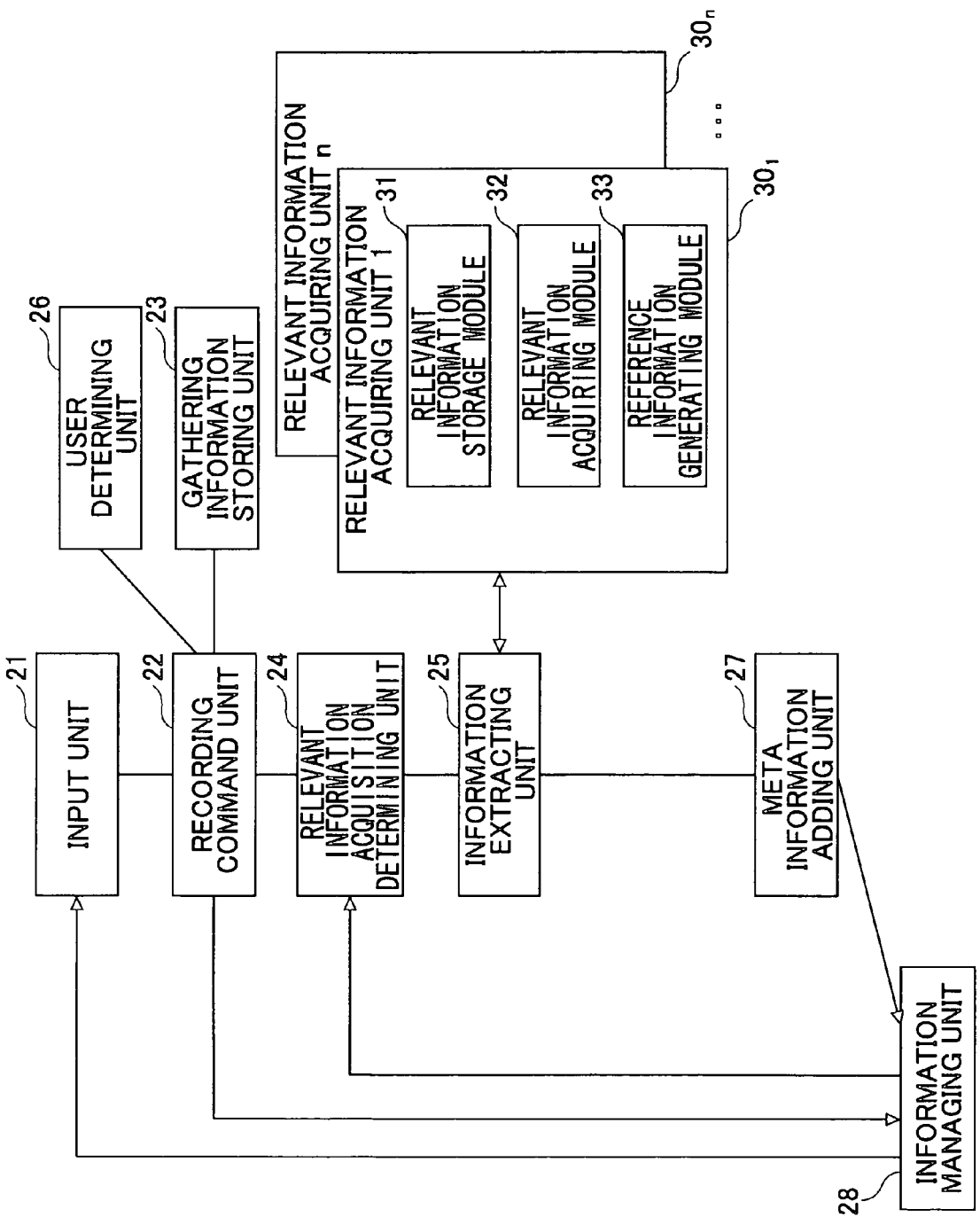
FIG. 2 is a block diagram showing a functional configuration of the information processing apparatus according to the first embodiment.

FIG. 2 is a block diagram showing a functional configuration of the information processing apparatus according to the first embodiment. As is shown in this drawing, the information processing apparatus of the present embodiment includes an input unit 21, a recording command unit 22, a gathering information storing unit 23, a relevant personal information acquisition determining unit 24, an information extracting unit 25, a user determining unit 26, a meta information adding unit 27, an information managing unit 28, relevant information acquiring units 30 ($30_1, \ldots, 30_n$) as embodiments of a personal information storing unit.

Further, each relevant information acquiring unit $30_i$ includes a relevant information storing module 31, a relevant information acquiring module 32, and a reference information generating module 33.

The information managing unit 28 is configured to store image data files created by the image data generating part 2 from image data of images captured by the image capturing part 3, and other data files such as audio data files or moving image data files, for example.

The input unit 21 is configured to indicate a list of media data files that are stored in the information managing unit 28 at the indications part 9 to prompt the user to designate a data file using the input part 8.

The recording command unit 22 is configured to designate from personal information managing services stored in the gathering information storing unit 23 a personal information managing service for obtaining relevant personal information to be added to an image data file designated by the input unit 21.

The gathering information storing unit 23 (embodied by the gathering information storage part 5) stores information for identifying a source from which relevant personal information to be stored in an image data file is acquired such as a database managing PIM information (personal information) or a personal information managing service managing the relevant personal information. It is noted relevant personal information may be information that can be obtained from a personal schedule manager, a contact information database, work information, or mail information, for example. By storing information for identifying the personal information managing service (gathering information subject) from which such relevant personal information may be obtained, the relevant personal information may be accurately and easily gathered.

In one embodiment, the gathering information storing unit 23 may store character strings (key words) corresponding to the personal information managing services (gathering information subjects). For example, in FIG. 3A, "SCHEDULE" indicates that relevant personal information is to be obtained from the schedule manager, "ADDRESS" indicates that relevant personal information is to be obtained from the contact information database, "MAIL" indicates that relevant personal information is to be obtained from mail information, and "GPS" indicates that information such as map information corresponding to a designated location information is to be obtained.

Figure 4:
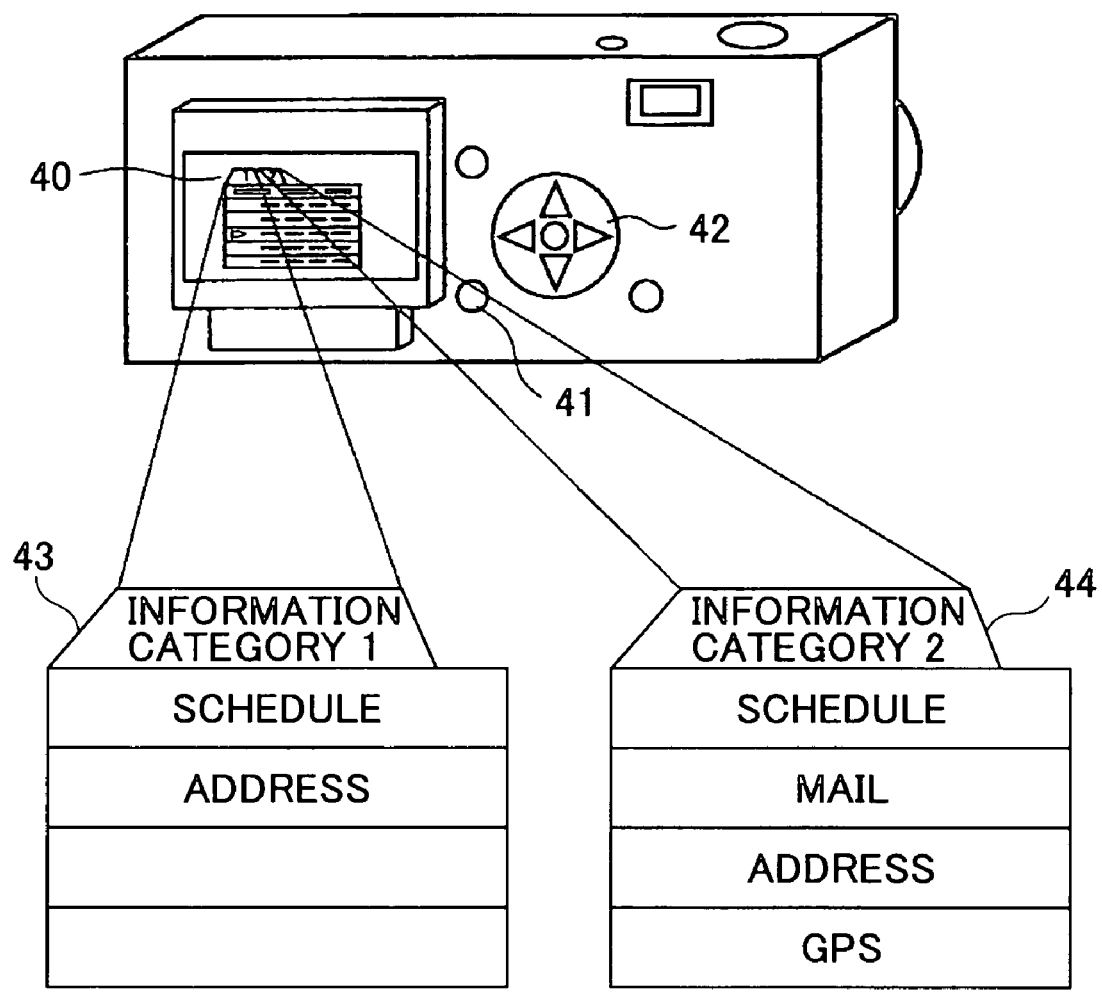
FIG. 4 is a diagram illustrating an exemplary manner in which information to be gathered is designated.

In another example as is shown in FIG. 3B, plural information categories may be provided that include different combinations of personal information managing services, and one of the information categories may be designated. Specifically, as is shown in FIG. 4, tabs 40 corresponding to the information categories may be indicated at the indication part 9, and a given tab 40 may be selected using a cross key 42 and a determination button 41. For example, selection of the information category 1 signifies that "SCHEDULE" and "ADDRESS" are selected.

The recording command unit 22 is configured to indicate at the indication part 9 the personal information managing services that are stored in the gathering information storing unit 23, and prompt the user to select one of the personal information managing services.

In another embodiment, all the personal information managing services that are stored in the gathering information storing unit 23 may be automatically selected.

In the present embodiment, since a personal information managing service to be arbitrarily selected, personal information may be easily accessed.

The recording command unit 22 generates a character string representing the selected personal information managing service according to a predetermined description rule (e.g., inserting a process execution keyword "Ctxt>" as a prefix, the character string of the prefix not being used for any other purpose), and inserts the generated character string in the meta information storage area of an image data file designated by the input unit 21 to update the image data file.

For example, in a case where "SCHEDULE" and "ADDRESS" correspond to keywords representing the selected personal information managing services, the character strings "Ctxt>SCHEDULE" and "Ctxt>ADDRESS" may be generated, or a character string "Ctxt>SCHEDULE ADDRESS" that combines the two keywords may be generated.

Figure 5:
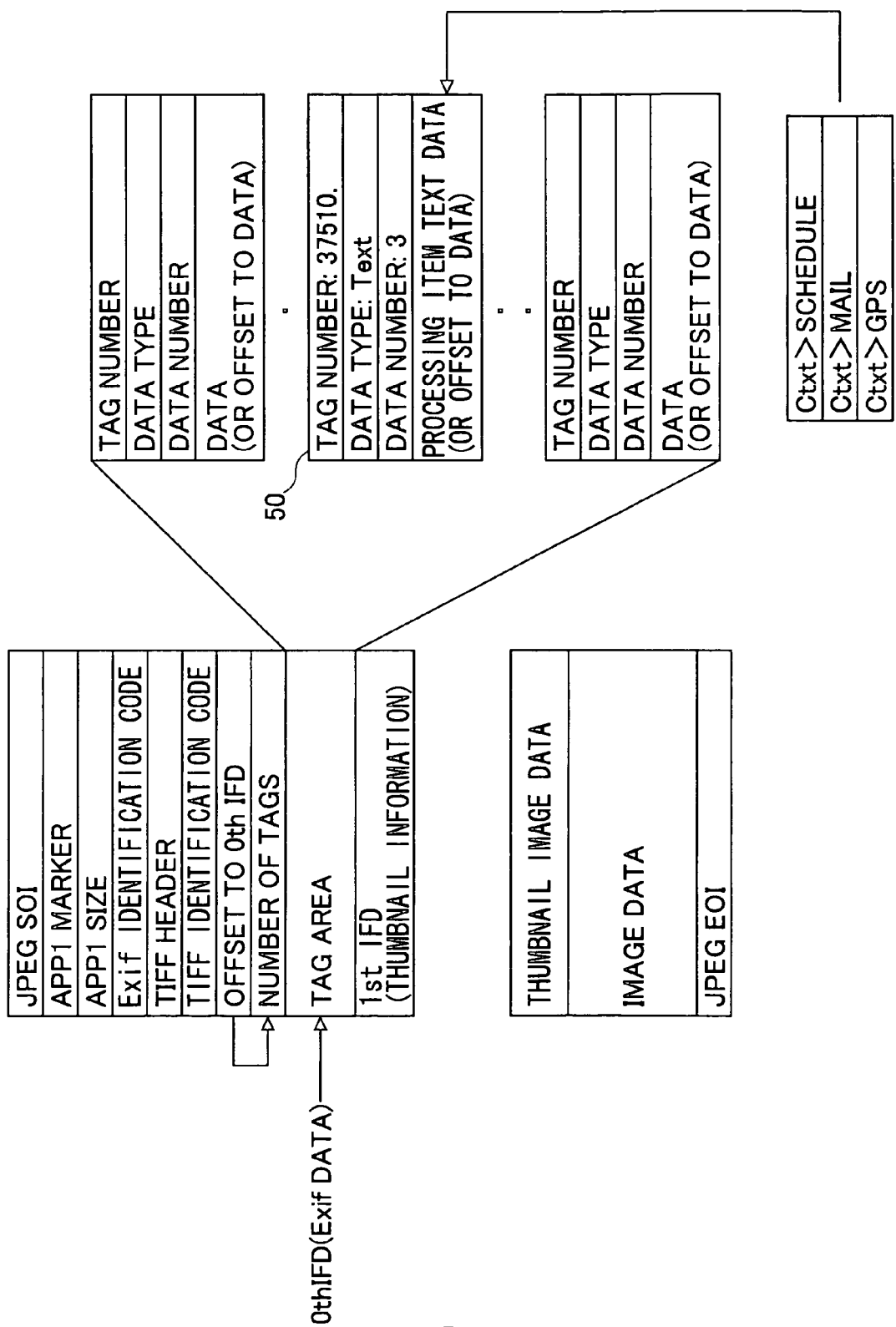
FIG. 5 is a table illustrating an exemplary case of storing the information to be gathered in a meta information storage area of an image data file.
Figure 6:
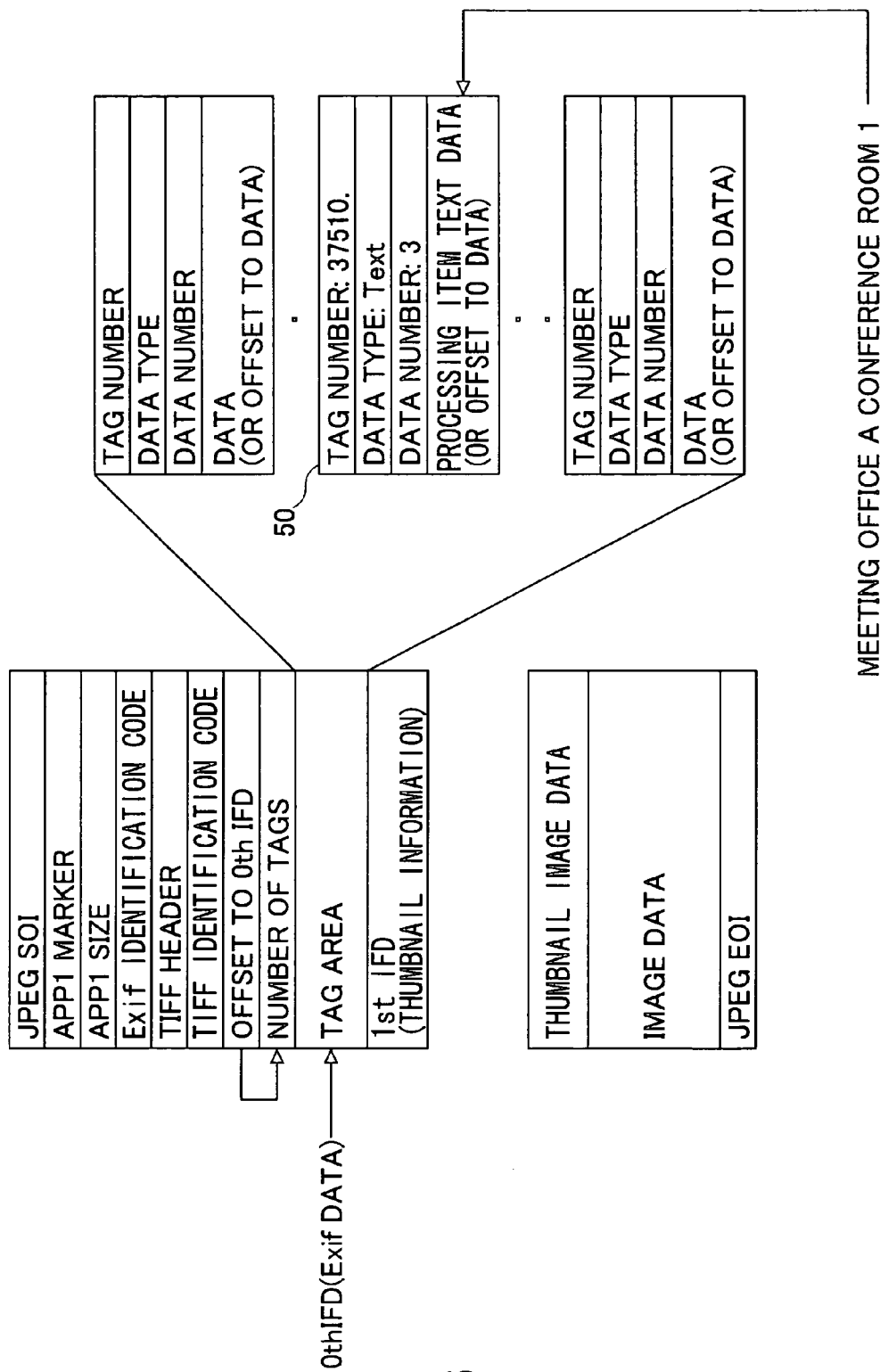
FIG. 6 is a table illustrating an exemplary case of storing relevant information in the meta information storage area.

In the case where the image data file is in accordance with the Exif data format, a relevant file name (e.g., full path name) as text information may be described in a predetermined area of the meta information storage area of the image data file as is shown in FIG. 5.

For example, the file name may be written in a user comment tag 50 since text may be freely written in the user comment tag 50. Also, since the Exif format conforms to the JPEG format, write areas may be established in application marker areas that are not used by the Exif format, for example. In this case, image operations such as image searching may be performed via a service provided with an interface for manipulating meta information so that other services may use the meta information.

Also, an individual of which personal information (PIM information) is subject to relevant personal information acquisition has to be designated. In the case where the apparatus is used by a sole individual, this individual may be identified in the owner information stored in the owner information storage part 6 upon initializing the apparatus. In the case where the apparatus is to be used by plural individuals, information pertaining to the plural individuals may be stored as owner information in the owner information storage part 6. It is noted that owner information may be information that enables a personal information managing service to identify a user (e.g., user ID, mail address).

However, in the case where the apparatus is used by one individual, the owner information may be an apparatus unique number or code (apparatus identification information) such as the serial number of an information terminal such as a PDA, or the telephone number of a mobile phone.

The recording command unit 22 activates the user determining unit 26 to acquire owner information identifying the user of which the relevant personal information is to be acquired. The user determining unit 26 indicates the owner information stored in the owner information storage part 6 at the indication part 9, and transmits the owner information selected by the user.

However, in a case where the present apparatus is used by only one user, the a database (DB) 11 may be provided on the network 10, the DB 11 being configured to store and manage owner information that associates the user with apparatus identification information, and the DB 11 may be referenced to acquire the owner information.

Also, the recording command unit 22 activates the relevant information acquisition determining unit 24 to transmit image data file address information of an image data file designated by the input unit 21 and the owner information.

The relevant information acquisition determining part 24 determines whether a keyword is recorded in the meta information storage area of the image data file designated by the input unit 21. Specifically, the relevant information acquisition determining part 24 analyzes whether a keyword that is written according to a predetermined description rule such as a keyword having the prefix "Ctxt>" is recorded in the meta information storage area. If it is determined that a keyword written according to a predetermined description rule does not exist, relevant personal information extraction is not performed on the current image data file.

On the other hand, if it is determined that a keyword written according to a predetermined description rule does exist, the keyword is extracted from the meta information storage area. For example, if two keywords such as "Ctxt>SCHEDULE" and "Ctxt>ADDRESS" exit, the keywords "SCHEDULE" and "ADDRESS" are extracted.

The relevant information acquisition determining unit 24 transmits a list of the extracted keywords to the information extracting unit 25.

The information extracting unit 25 acquires relevant personal information corresponding to each of the keywords transmitted from the relevant information acquisition determining unit 24 for the image data file designated by the input unit 21, creates a temporary file of the acquired relevant personal information, and stores the temporary file in the storage part 4.

To extract relevant personal information corresponding to a given keyword, the information extracting unit 25 hands over the designated owner information, the image data file address information of the image data file, and search key information stored in the image data file to the relevant information acquiring unit 30$_i$ corresponding to the given keyword, and activates the relevant information acquiring unit 30$_i$.

It is noted that the search key information stored in the image data file may be information of the image capture time/date information or image capture location information stored in the meta information storage area of the image data file.

In the present embodiment, the relevant information acquiring unit 30$_i$ is described as being arranged within the information processing apparatus. However, in the case where personal information such as schedule management information, contact information DB, work information, and mail information is managed by a system operating over the network 10, the relevant information acquiring unit 30$_i$ may be provided in the system operating over the network 10, for example. Also, it is noted that the personal information may be distributed and managed at both the present information processing apparatus and the system operating over the network 10.

When the relevant information acquiring unit 30$_i$ is activated, the relevant information acquiring module 32 is activated.

The relevant information acquiring module 32 refers to the relevant information storing module 31 and searches for personal information matching the search key information from the personal information of the user identified by the owner information, and extracts personal information corresponding to a predetermined item that matches with the search key information as relevant personal information.

Then, the relevant information acquiring unit 30$_i$ activates the reference information generating module 33.

The reference information generating module 33 links the personal information corresponding to the search key information to the image data file address of the image data file handed over from the information extracting unit 25 and records the link in the relevant information storing unit 31.

Then, the relevant information acquiring unit 30$_i$ transmits the acquired relevant personal information to the information extracting unit 25.

The meta information adding unit 27 is activated by the information extracting unit 25. The meta information adding unit 27 is configured to read the extracted relevant personal information from a temporary file and update the meta information storage area of the image data file stored in the information managing unit 28. The meta information storage area may be an area that is not used by the Exif format (e.g., a header area of an area defined by the JPEG format that is not used by the Exif format) and may be a dedicated area that is not used by other applications, for example. In this case, image operations such as image searching may be performed via a service provided with an interface for manipulating meta information so that other services may use the meta information.

In another embodiment, the extracted relevant personal information (e.g., "SUBJECT", "LOCATION", "WORK INFORMATION", etc.) may be read from the temporary file, a text file may be generated that describes all or a portion of the relevant personal information in a predetermined format (e.g., xml format), and the text file may be stored in the storage part 4 (or in a predetermined folder of a storage device implemented over a network) as a relevant personal information file with a file name that is generated based on the file name of the recorded image data file according to a predetermined rule. A relevant personal information file address representing the address of the relevant personal information file may be recorded in the meta information storage area of the image data file.

In this case, since the extracted relevant personal information is stored separately from the image data file, the relevant personal information may not be restricted by limitations in the capacity of the meta information storage area so that the gathered relevant personal information may be efficiently stored and managed in the meta information storage area. Also, even when the image data file is copied and distributed, the personal information associated with the image data file may be protected.

In the following, exemplary processes performed by the information extracting unit 25 and the relevant information acquiring unit 30 are described in a case where the keyword "SCHEDULE" representing a schedule managing PIM is stored.

The information extracting unit 25 analyzes the gathering information storing unit 23, activates the schedule managing PIM (relevant information acquiring unit 30) corresponding to the character string (keyword) "SCHEDULE" that operates within the present information processing apparatus, and transmits the image data file address information and image capture time/date information to the relevant information acquiring unit 30 as parameters.

The schedule managing PIM (relevant information acquiring module 32) refers to the managed schedule (relevant information storing module 31), and searches for a personal schedule that has a time range including the capture time/date represented by the transmitted image capture time/date information. If such a personal schedule is found, information items such as the "start time", "end time", "subject", "location", and "work information" of the personal schedule are extracted as relevant personal information.

Then, the schedule managing PIM (relevant information acquiring unit 30) transmits the extracted information items to the information extracting unit 25.

Also, the schedule managing PIM (reference information generating unit 33) links the address of the image data file with the personal schedule having a time range covering the corresponding capture time/date, and registers the address in the personal schedule managing PIM.

For example, as is shown in FIG. 7, a link to a file name of the image data file (e.g., reference information including path information) may be recorded in an area 61 of a personal schedule managing application 60 where a user may freely write additional information. In this way, the existence of an image data file associated with a schedule may be recognized by the user upon using the personal managing service, and the image data may be referenced from the reference information via the personal information managing service.

Also, it is noted that location information such as GPS information may be obtained at the present information processing apparatus in addition to the image capture time/date information. Thus, if image capture location information based on GPS information is supported by the personal information managing service side, the image capture location information transmitted from the information extracting unit 25 or map information corresponding to the image capture location information may be compared with the location information described in the personal information. Then, a determination may be made as to whether the information items of the personal information are relevant information based on predetermined criteria (e.g., whether the location information of captured image data and the location information of the PIM information item match or represent locations within the same building).

Also, in a case where the personal information managing service is provided over a network, the personal information managing service (e.g., schedule managing PIM) and owner information identifying the relevant user (e.g., user name, user ID, mail address, etc.) may be transmitted to obtain the relevant personal information of a specific individual (user) identified by the owner information.

Figure 8:
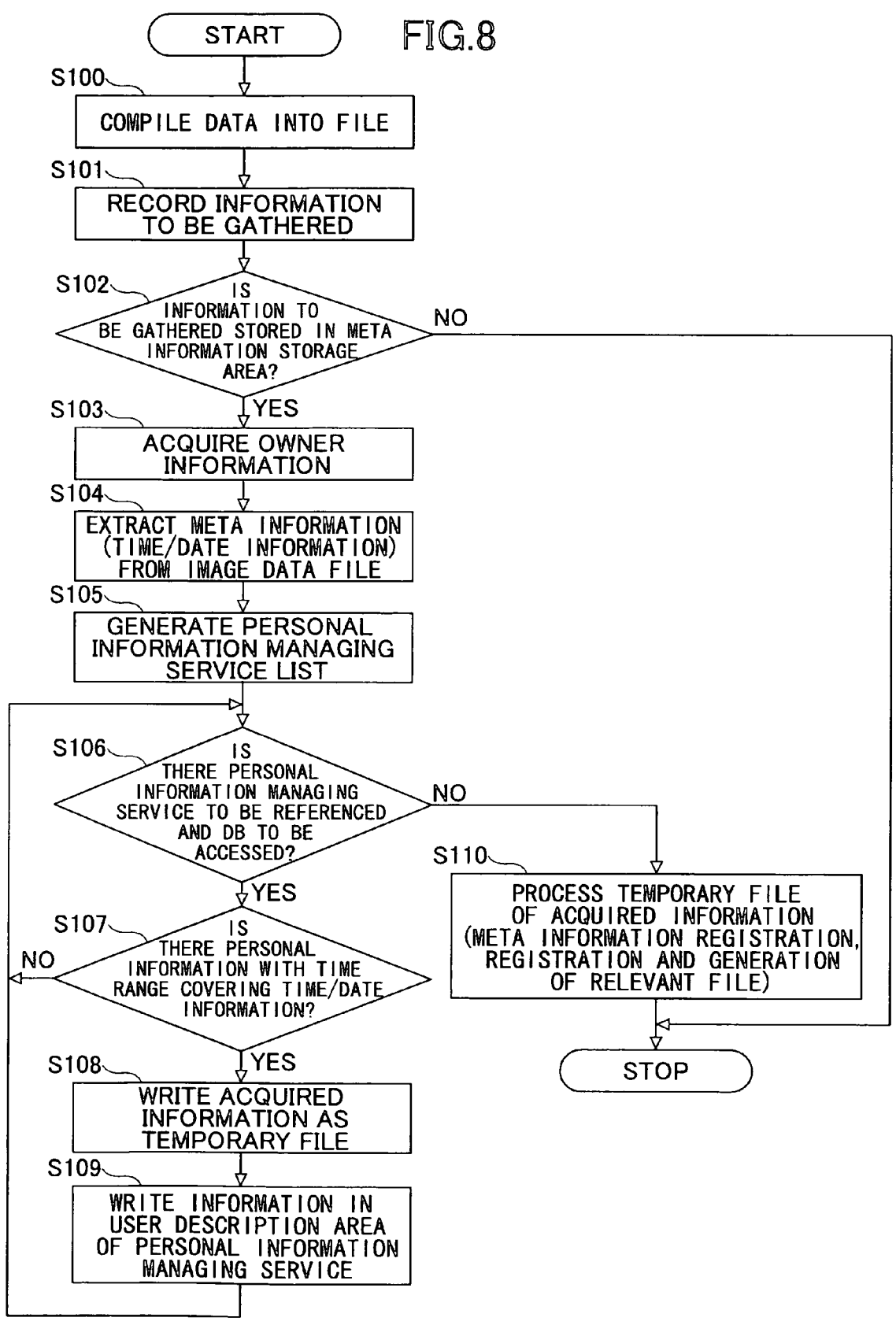
FIG. 8 is a flowchart illustrating process steps to be executed by the information processing apparatus according to the first embodiment.

In the following, process steps according to the present embodiment are described with reference to the flowchart shown in FIG. 8.

It is noted that the process steps are described below in relation to a specific example where a user attending a meeting captures images of the meeting, the attendees, and presented documents, for example, as notes, and records image data of the captured images.

Also, in the example described below, it is assumed that an agent application for executing the functions of the present embodiment is activated within the information processing apparatus beforehand. Alternatively, means for executing the functions of the present embodiment may be activated in response to a direct command or the execution of image capturing operations, for example.

According to the present embodiment, when a user captures object information (image data) as notes, the captured image data may be recorded as an image data file in the storage part 4 within the information processing apparatus (step S100). In another example, in a case where images are captured beforehand, the user may designate the image data file to be processed.

Then, information such as image capture time/date information and/or image capture location information are extracted from the designated image data file, and information to be gathered that is designated by the user from the information subjects stored in the gathering information storing unit 23 is recorded in the meta information storage area of the designated image data file (step S101). It is noted that the stored contents of the gathering information storing unit 23 may be generated when the corresponding function of the gathering information storing unit 23 is activated, for example.

Then, a determination is made as to whether the information to be gathered (information gathering subject) is recorded in the meta information storage area of the designated image data file (step S102). If the information to be gathered is not recorded in the meta information storage area of the designated image data file (step S102, NO), the process is ended.

On the other hand, if information to be gathered is recorded in the meta information storage area of the designated image data file (step S102, YES), owner information of the user currently operating the information processing apparatus is acquired (step S103), the image capture time/date information (search key information) is acquired from the meta information storage area of the image data file (step S104), and information to be gathered that is recorded in the meta information storage area is analyzed to generate a list of personal information managing services from which relevant personal information is to be gathered (step S105).

It is noted that in recording the above-described gathering information subjects in the meta information storage area of the image data file, the personal information managing services from which relevant personal information is to be gathered may be described in text format as keywords, and these keywords (e.g., "SCHEDULE", "MAIL", etc.) may be written in the meta information storage area of the image data file according to a predetermined description rule. For example, the description rule may require attaching a process execution keyword "Ctxt>" as a prefix at the head of the information subject keywords, and this prefix may be used to instruct acquisition of relevant personal information from the personal information managing services represented in the list of keywords. Also, it is noted that the list of the personal information managing services from which relevant personal information is to be gathered is generated by identifying the personal information managing services corresponding to the keywords listed in the list of keywords recorded in the meta information storage area of the image data file.

Then, an unprocessed personal information managing service is extracted from the generated list of the personal information managing services from which relevant personal information is to be gathered. Then, the extracted personal information managing service is referenced, and access is made to the database managing this personal information managing service (step S106, YES). If personal information with a time range covering the image capture time/date of the captured image data is not included in this personal information managing service (step S107, NO), it may be assumed that processing has been completed for this personal information managing service, and the process goes back to step S106.

On the other hand, if personal information with a time range covering the image capture time/date of the captured image data is included in the personal information managing service subject to processing (step S107, YES), information items such as the start time, the end time, the subject, and the location may be obtained from the personal information and written in the storage part 4 as a temporary file (step S108).

It is noted that the determination of whether the corresponding personal information is included in the personal information managing service may also be made based on information other than the image capture time/date information. For example, in a case where the information processing apparatus is capable of obtaining image capture location information or map information corresponding to the image capture location information (e.g., the corresponding map information may be searched within the apparatus or via a service provided over a network), such image capture location information may be used to determine whether corresponding personal information is stored in the personal information managing service. In this case, location information obtained by the information processing apparatus may be compared with the image capture location information described in the personal information to determine whether the obtained location information and the image capture location information of the personal information match or represent locations within the same building.

Then, the personal information with the time range covering the capture time/date of the captured image is associated with the designated image data file (step S109). Then, it is assumed that processing has been completed for the extracted personal information managing service, and the process goes back to step S106.

When there is no longer any unprocessed personal information managing services in the list of personal information managing services from which relevant personal information is to be gathered (step S106, NO), the acquired sets of relevant personal information written as temporary files are organized to unify overlapping information and record the organized relevant personal information in the meta information storage area of the designated image data file (step S110).

Alternatively, the acquired relevant personal information (e.g., "subject", "location", "work information", etc.) may be organized to unify overlapping information and a text file according to a predetermined format (e.g., xml format) may be generated so that the relevant information may be stored under a file name that is generated according to a predetermined rule based on the file name of the designated image data file, and this file name may be recorded in the meta information storage area of the image data file as a relevant personal information file.

As can be appreciated from the above descriptions, in the case of electronically recording an image or other real world information, gathering information subjects from which relevant personal information is to be gathered are listed (personal information managing service list), and this list is used to acquire relevant personal information or relevant personal information file address information representing the storage location of a relevant personal information file and associate or embed the acquired relevant personal information or personal information file address information with/in the meta information storage area of an image data file so that reuse of image data such as calling an acquired image from a personal information managing service or image searching using personal information may be facilitated.

Second Embodiment

In a case where an apparatus that acquires image and audio information does not have functions for managing personal information, the information acquiring apparatus may record acquired image or audio information and relevant information thereof in another apparatus.

Figure 9:
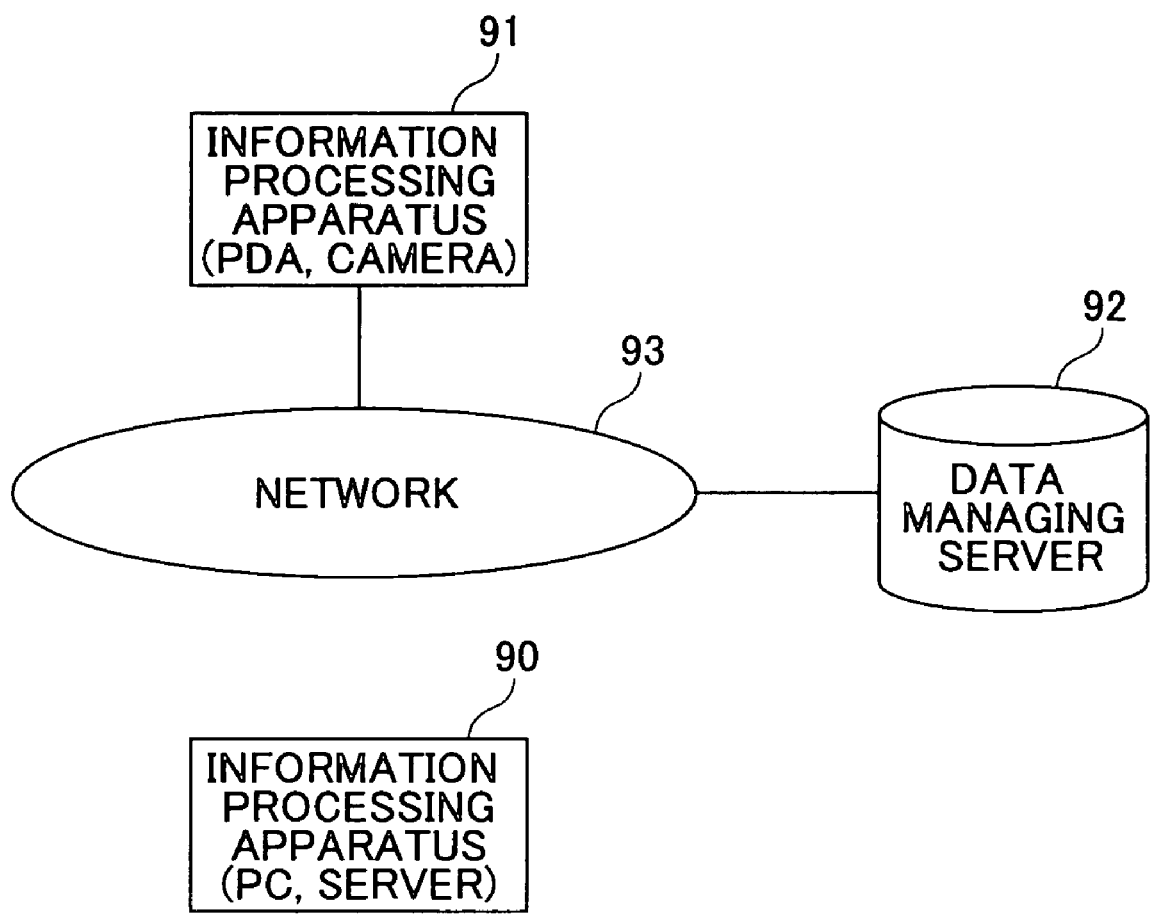
FIG. 9 is a diagram showing an overall configuration of an information recording system according to a second embodiment of the present invention.

FIG. 9 is a diagram showing an information recording system according to a second embodiment of the present invention. The information recording system shown in this drawing includes an information processing apparatus 91 that is owned or operated by a user, an information processing apparatus 90 that stores information transmitted from the information processing apparatus 91, a data managing server 92 that stores and manages personal information of the user, and a network 93 that interconnects the above apparatuses.

The information processing apparatus 91 may be an image recording apparatus (e.g., camera, video camera), an audio recording apparatus (e.g., IC recorder), a mobile phone, or a PDA that is capable of acquiring audio or an image, for example. In the following, an exemplary case is described where a camera is used as the information processing apparatus 91.

The information processing apparatus 90 may be a personal computer (PC) owned/used by a sole individual or a small group of individuals or a server computer for sharing data, for example. The information processing apparatus 90 is connected to the information processing apparatus 91 via the network 93 and is configured to receive an image data file from the information processing apparatus 91 and store the received image data file. In this case, the information processing apparatus 90 also acquires and stores personal information recorded in the data managing server 92 as relevant personal information.

The data managing server 92 may be a server computer that manages relevant personal information of users, and includes a server for managing personal information and a database (DB) that stores the personal information. The data managing server 92 is configured to extract relevant personal information based on information from the information processing apparatus 91 including information to be gathered, owner information for identifying the user (e.g., user ID, mail address), and search key information for acquiring the relevant personal information, and transmit the extracted information to an apparatus that requests for such information.

The network 93 may be a LAN (Local Area Network), a WAN (Wide Area Network), or the Internet, for example, that interconnects the above-described apparatuses.

Figure 10:
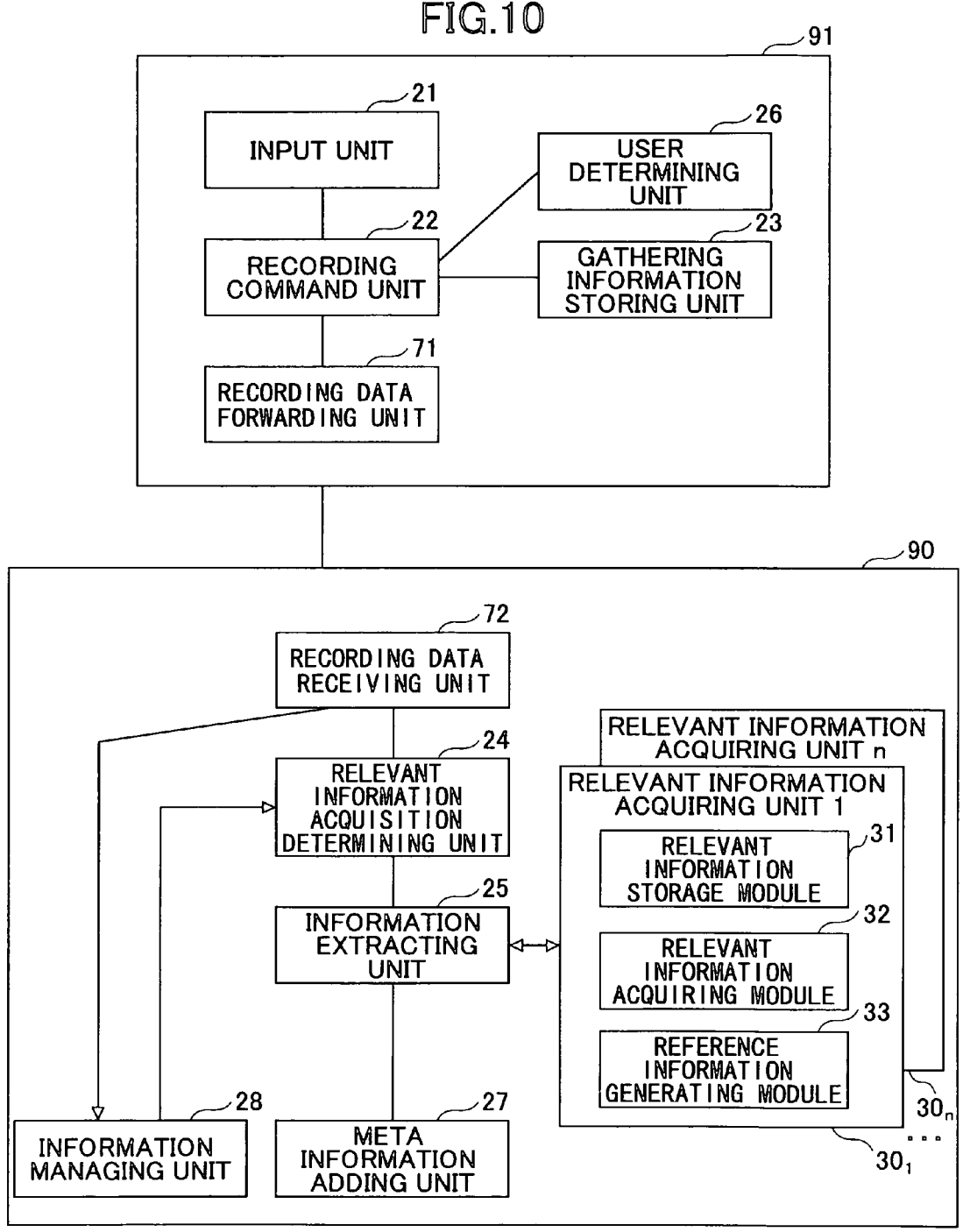
FIG. 10 is a block diagram showing a functional configuration of the information recording system according to the second embodiment.

FIG. 10 is a block diagram showing a functional configuration of the information recording system according to the second embodiment. In this drawing, the information processing apparatus 91 includes an input unit 21, a recording command unit 22, a gathering information storing unit 23, a user determining unit 26, and a recording data forwarding unit 71.

The information processing apparatus 90 includes a recording data receiving unit 72, a relevant information acquisition determining unit 24, an information extracting unit 25, a meta information adding unit 27, an information managing unit 28, and relevant information acquiring units 30 ($30_1, \ldots, 30_n$). It is noted that each information acquiring unit $30_i$ includes a relevant information storing module 31, a relevant information acquiring module 32, and a reference information generating unit 33.

It is noted that in FIG. 10, component elements that have identical functions to those shown in FIG. 2 are given the same reference numerals and their descriptions are omitted.

In a case where the information processing apparatus 91 such as a digital camera with communication functions is not equipped with functions for managing personal information, a user of the information processing apparatus 91 may activate an agent application for executing the functions of the present embodiment in the information processing apparatus 90 (e.g., PC or server) where the user normally manages his/her personal information.

At the information processing apparatus 91, the recording command unit 22 selects via the input unit 21 the personal information managing service from which relevant personal information is to be gathered for acquiring relevant personal information to be added to the image data file designated by the unit 21, generates a character string (keyword) representing the selected personal information managing service according to a predetermined description rule, and writes the generated keyword in the meta information storage area of image data file designated by the input unit 21, and records the image data file with the keyword written therein in the storage part 4.

Then, the recording data forwarding unit 71 transmits the image data file and owner information for identifying the user operating the information processing apparatus 91 to the designated information processing apparatus 90 using a file transfer protocol (FTP) function.

At the information processing apparatus 90, the recording data receiving unit 72 receives the image data file and the owner information transmitted from the information processing apparatus 91, and temporarily records the image data file and the owner information in the information managing unit 28. In this case, image data file address information representing the address of the image data file within the information managing unit 28 is stored in the meta information storage area of the image data file. Based on the information recorded in the information managing unit 28, relevant personal information may be acquired from the data managing server 92. It is noted that the relevant personal information may be obtained and recorded in a manner similar to that described in relation to the first embodiment.

Also, in another embodiment, the gathering information storing unit 23 may be provided in the information processing apparatus 90, and upon storing an image data file obtained from the information processing apparatus 91 via the recording data receiving unit 72 in the information managing unit 28, information to be gathered stored in the gathering information storing unit 23 may be stored in the meta information storage area of the image data file.

Modification of Second Embodiment

Figure 11:
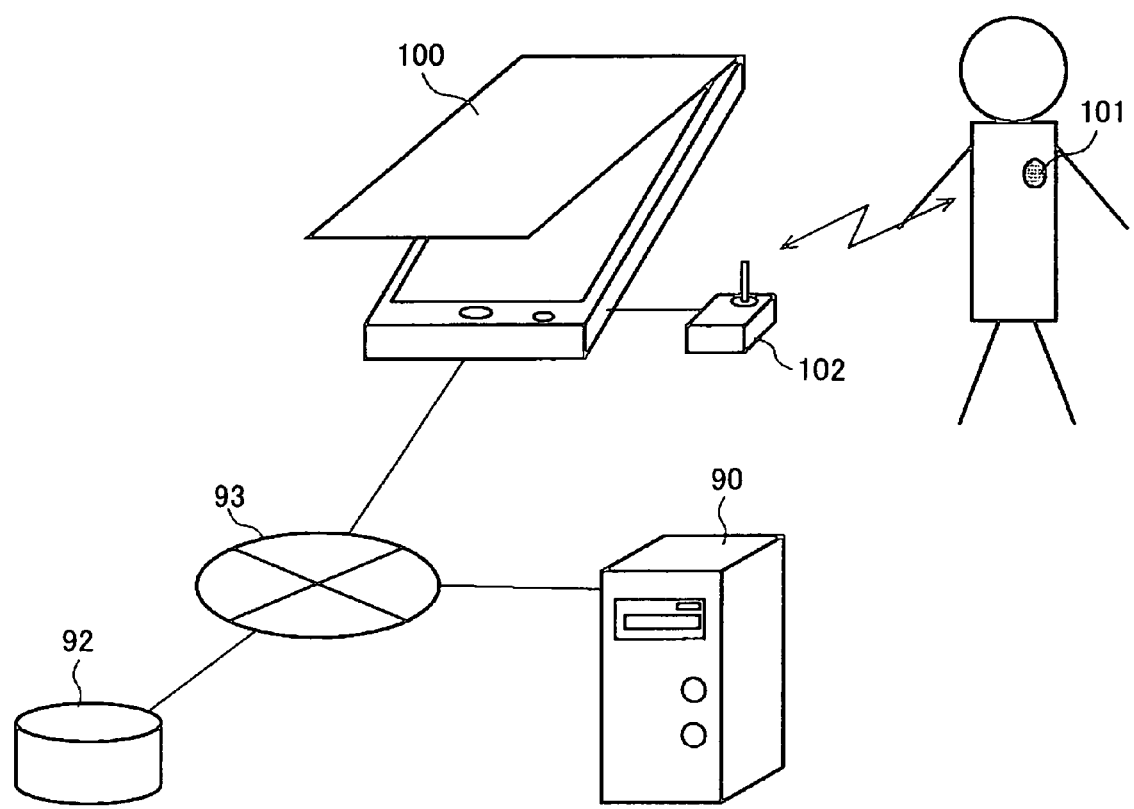
FIG. 11 is a diagram showing an information recording system according to a modification of the second embodiment.

In the following, an example is described where the information processing apparatus 91 of the second embodiment is an information processing apparatus 100 such as a scanner or a MFP that is shared by plural users as is shown in FIG. 11.

In the modification of the second embodiment as is shown in FIG. 11, the information processing apparatus 100, the information processing apparatus 90, and the data managing server 92 are interconnected by the network 93. Also, a user owns a device 101 for RFID tag authentication, and the information processing apparatus 100 includes a reader 102 for reading RFID information of the device 101. The data managing server 92 stores the RFID information in association with owner information.

When a user scans a document, the scanned image is temporarily stored in a storage part of the information processing apparatus 100 as a scanned image data file. In the case where the forwarding destination of the scanned image data file is to be designated, the recording command unit 22 is activated.

The recording command unit 22 indicates the gathering information subjects stored in the information processing apparatus 100, and prompts selection of desired personal information managing service from which personal information is to be gathered.

Also, the recording command unit 22 activates the user determining unit 26 to identify the user. The user determining unit 26 reads the RFID information of the device 101 with the reader 102, and transmits the read RFID information to the data managing server 92 to acquire its corresponding owner information.

The recording command unit 22 writes the information to be gathered in the meta information storage area of the image data file of the scanned image data that is temporarily stored, and transmits the scanned image data file with the written information and the owner information to the information processing apparatus 90 via the network 93.

It is noted that the operations of the information processing apparatus 90 upon receiving the transmitted information may be similar to the operations described above in relation to the second embodiment.

Also, it is noted that in the present modification, RFID information is used to identify the user. However, the present invention is not limited to use of such information for identification, and in alternative embodiments authentication means using biometric information such as face image, iris, voice, or fingerprint information may be provided to identify the user, for example.

As can be appreciated from the above descriptions, when an image data file having relevant personal information written in its meta information storage area is distributed to plural unspecified destinations, confidential personal information may be leaked thereby leading to problems relating to invasion of privacy.

Figure 12:
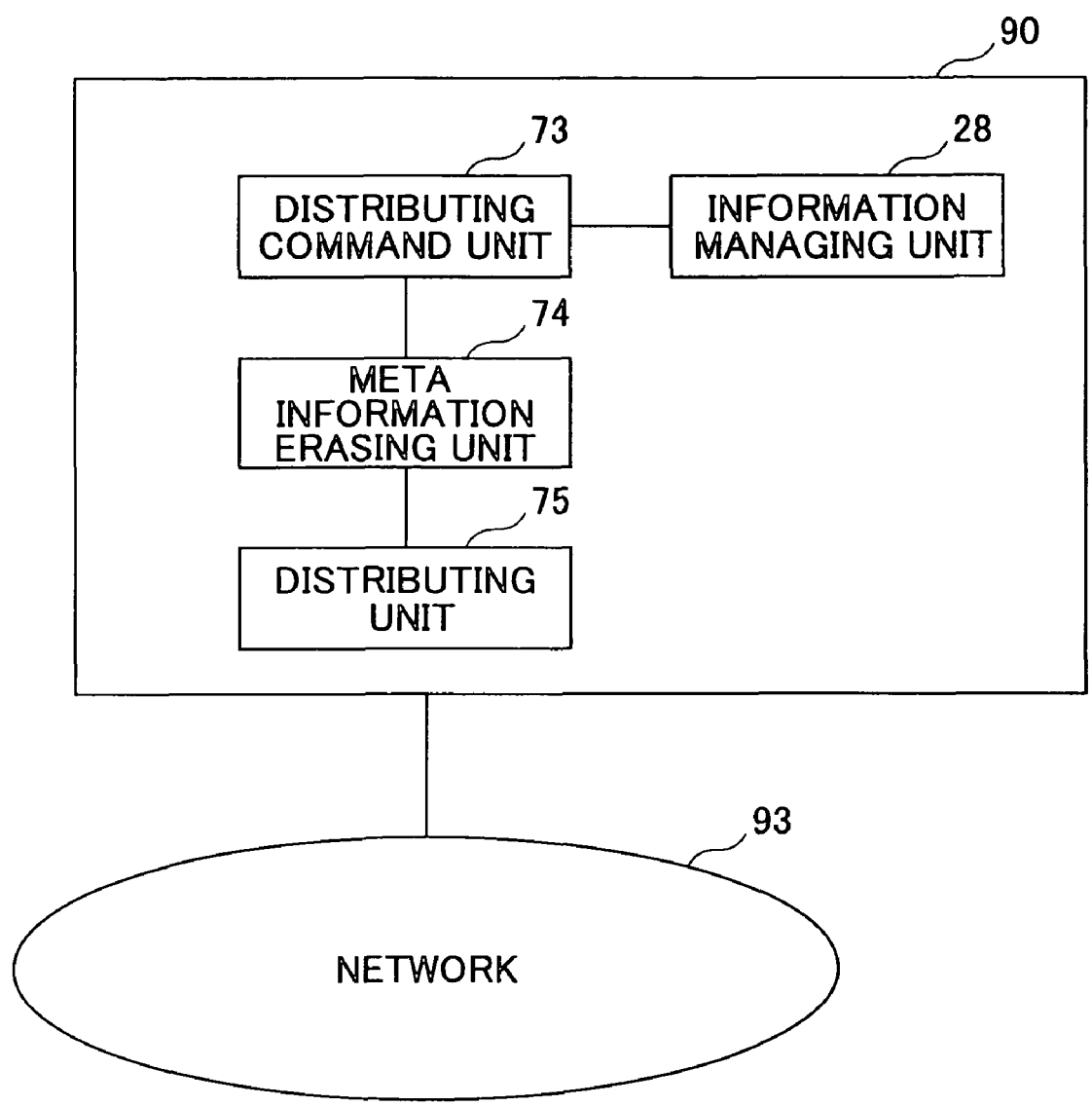
FIG. 12 is a block diagram showing a functional configuration of an information processing apparatus of the modified information recording system in the case where acquired information is distributed.

Accordingly, as is shown in FIG. 12, in the case of distributing an image data file to plural unspecified destinations, a distributing command unit 73 is activated to prompt the user to designate the image data file to be distributed from the image data files stored in the information managing unit 28.

Then, a meta information erasing unit 74 is activated so that portions of the relevant personal information that are confidential or all of the relevant personal information may be erased from the meta information storage area of the designated image data file to be distributed.

After erasing the relevant personal information, the image data file with the relevant personal information erased therefrom is distributed to destinations designated by a distributing unit 75.

By making arrangements to enable intentional erasing of relevant personal information that is desirably kept confidential as is described above, privacy protection may be effectively realized.

Third Embodiment

In the following, a third embodiment of the present invention is described. The third embodiment of the present invention is a modification of the first embodiment described above. Specifically, in the present embodiment, the owner information stored in the owner information storage part 6 is modified with respect to that of the first embodiment. It is noted that the overall configuration and functional configuration of an information processing apparatus according to the third embodiment are similar to those of the first embodiment. Accordingly, the overall configuration of the information processing apparatus according to the third embodiment is described with reference to FIG. 1, and the functional configuration of the information processing apparatus according to the third embodiment is described with reference to FIG. 2. It is noted that in the third embodiment, modifications are made with respect to the operations of the recording command unit 22, the relevant information acquisition determining unit 24, the information extracting unit 25, the user determining unit 26, and the relevant information acquiring unit $30_i$ of the first embodiment. In the following, units of the information processing apparatus of the third embodiment corresponding to the recording command unit 22, the relevant information acquisition determining unit 24, the information extracting unit 25, the user determining unit 26, and the relevant information acquiring unit $30_i$ of the first embodiment are referred to as recording command unit 22', relevant information acquisition determining unit 24', information extracting unit 25', user determining unit 26', and relevant information acquiring unit $30_i'$, and the differences in the operations of the above units are described. Also, a storage part of the information processing apparatus of the third embodiment that stores owner information that correspond to the owner information storage part 6 of the first embodiment is referred to as owner information storage part 6'.

Figure 14:
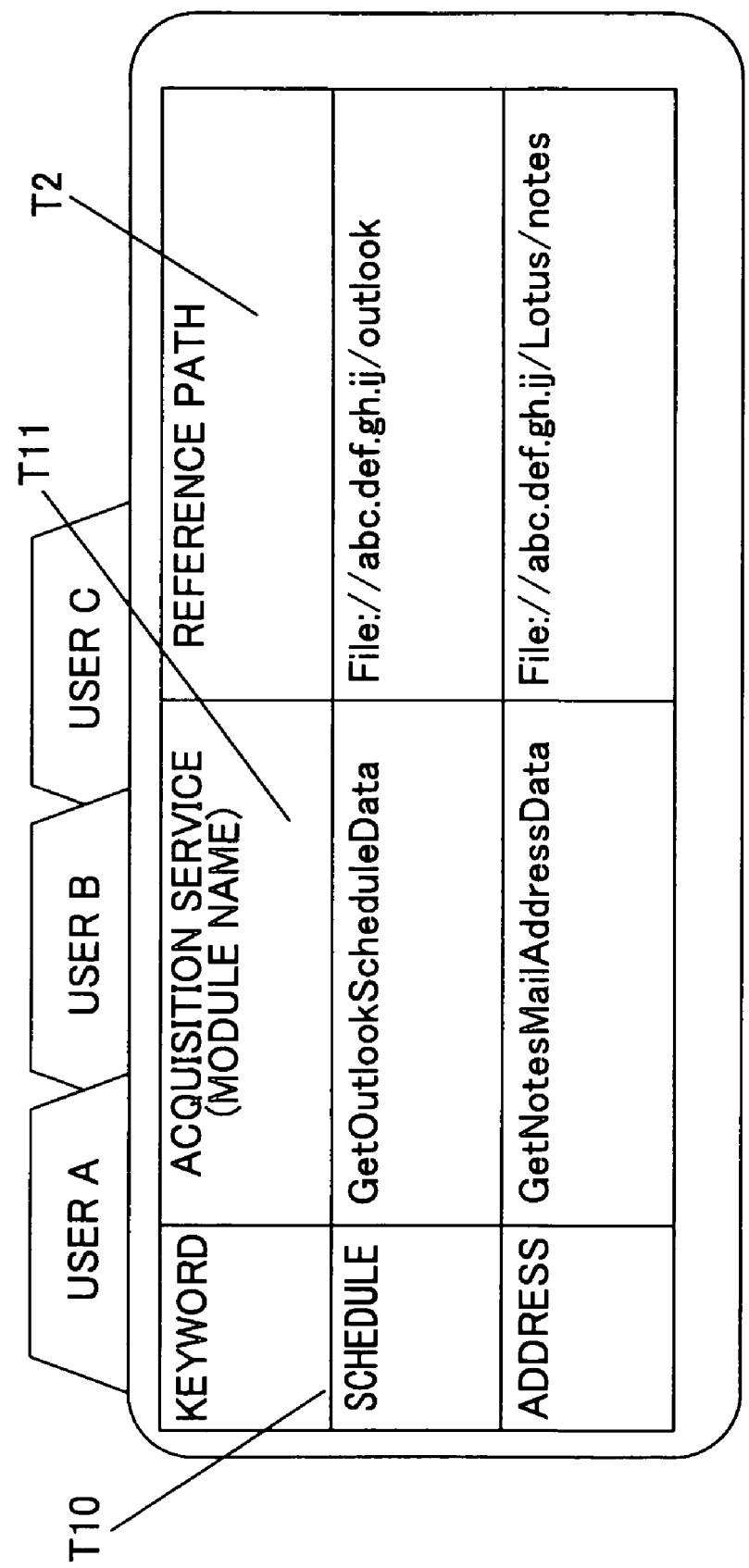
FIG. 14 is a table illustrating data that represents registered user information.

In the present embodiment, owner information stored in the owner information storage part 6 includes owner names representing users that use the present information processing apparatus, a list of keywords associated with each owner name that is made up of keywords stored in the gathering information storing unit 23, file names (or path names) of the relevant information acquiring units $30_i'$ that are to be activated by the information extracting unit 25' to acquire relevant personal information from personal information managing services corresponding to the keywords included in the list of keywords, and addresses of the databases for accessing the personal information managed for each user in the personal information managing services (e.g., see FIG. 14).

In the following, a method for registering the owner information is described.

1. Owner Information Registration

First, user registration for starting a service (initialization) is described.

Figure 13:
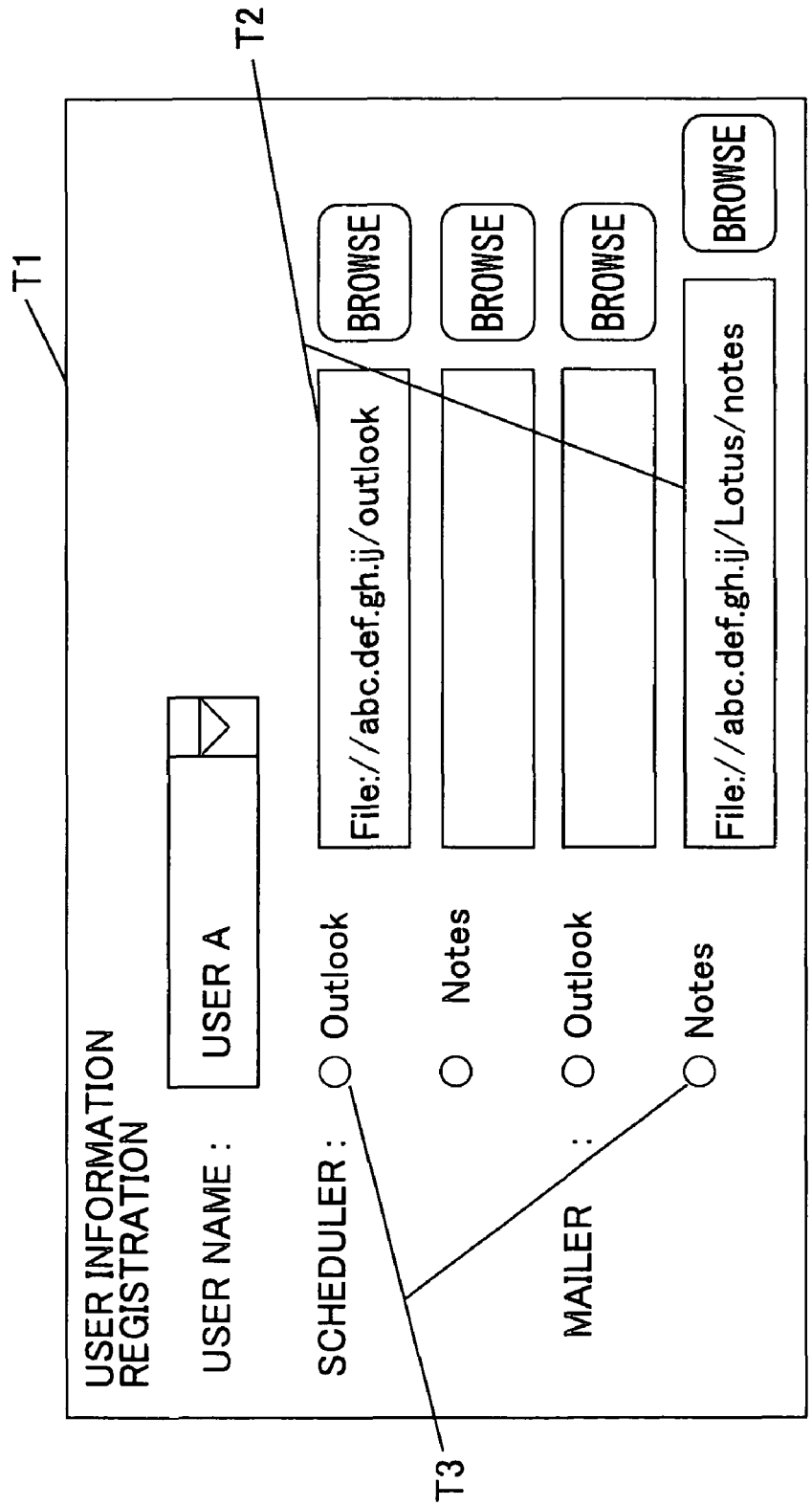
FIG. 13 is a diagram illustrating a user information registration screen that is displayed at an information processing apparatus according to a third embodiment of the present invention.

In the present embodiment, a user using the present information processing apparatus registers information pertaining to the personal information service that he/she is using beforehand. For example, as is shown in FIG. 13, a registration screen T1 (i.e., screen as an interface for adding data to application software generating registration data or database storing registration data) may be displayed at the indication part 9, and the registration screen T1 may be used to register via the input part 8 the personal information managing service T3 that is used by the user and database address information T2 indicating an address of the database for accessing the personal information managed for each user in the personal information managing service (i.e., path information for referencing the personal information). It is noted that personal information managing services that are accessed and referenced in the present embodiment include personal information services of which the interfaces for accessing the personal information being managed are publicly disclosed or personal information managing services of which means for directly accessing the personal information being managed is publicly disclosed. According to the present embodiment, a method for accessing and acquiring information from a personal information managing service is provided beforehand so that desired personal information may be automatically acquired. The registered user information may be stored as data arranged on a two-dimensional matrix as is illustrated in FIG. 14, for example. Specifically, an owner information database may be generated for each user (owner) and stored in the owner information storage part 6', the owner information database including keywords T10 that is used to enable the user to designate information to be gathered (i.e., keywords stored in the gathering information storing unit 23), the names (i.e., software module names) T11 of services (relevant information acquiring units 30$_i$') corresponding to the keywords from which relevant personal information is to be obtained, and database address information T2 indicating the addresses of the databases for accessing the personal information managed for each user in the personal information managing services.

2. Recording Command Unit

In the present embodiment, the recording command unit 22' activates the user determining unit 26' to acquire owner information of the user obtaining relevant information of acquired information. The user determining unit 26' indicates the owner information stored in the owner information storage part 6' at the indication part 9 to prompt the user to select an owner name, and transmits owner information to the recording command unit 22' which owner information includes the owner name selected by the user, keywords associated with the selected owner name, acquired module information indicating the name or path of the relevant information acquiring units 30$_i$' that are associated with the keywords, database address information indicating the paths to the databases associated with the selected owner name that are managed within the personal information managing services associated with the keywords. Then, the recording command unit 22' receiving the owner information prompts the user to designate an arbitrary personal information managing service from the received owner information, and stores the keyword corresponding to the designated personal information managing service in the meta information storage area of an image data file. It is noted that the keyword may be stored in the meta information area of the image data file by having the user designate the personal information managing service at the time the image data of the image data file are acquired. In another example, arrangements may be made so that a keyword corresponding to a specific personal information managing service may be stored in the meta information storage area of an image data file when image data of the image data file are acquired by the present information processing apparatus.

Also, the recording command unit 22' activates the relevant information acquisition determining unit 24' and transmits the address of an image data file designated by the input unit 21 and the owner information received from the user determining unit 26' to the relevant information acquisition determining unit 24'.

3. Relevant Information Acquisition Determining Unit

The relevant information acquisition determining unit 24' accesses the designated image data file based on the address of the image data file received from the recording command unit 22', and determines whether a keyword is stored in the meta information storage area of the of the image data file.

Specifically, the meta information storage area of the image data file is analyzed to determine whether a keyword that is written according to a predetermined description rule such as a keyword having a prefix "Ctxt>" at its head is stored therein. If a keyword written according to such a description rule is not stored in the meta information storage area, extraction of relevant personal information is not performed for the image data file.

On the other hand, if a keyword that is written according to such a description rule is stored, the keyword is extracted from the meta information storage area of the image data file.

The relevant information acquisition determining unit 24' compares the keyword extracted from the meta information storage area of the image data file with the keyword included in the owner information acquired from the recording command unit 22', and based on owner information corresponding to the keyword matching the extracted keyword, a personal information managing service list in which image data file information, a search key information, acquisition module information, and database address information are associated with each other and compiled into a list (e.g., see FIG. 16) is generated and transmitted to the information extracting unit 25'. It is noted that although the personal information managing service list is transmitted to the information extracting unit 25' in the above-described embodiment, in another embodiment, address information indicating the location where the personal information managing service list is stored may be transmitted to the information extracting unit 25', for example.

4. Information Extracting Unit

The information extracting unit 25' performs processes described below with respect to each keyword included in the personal information service list transmitted from the relevant information acquisition determining unit 24'.

First, the information extracting unit 25' compares the keyword transmitted from the relevant information acquisition determining unit 24' with the keyword included in the owner information transmitted from the recording command unit 22', and extracts the acquisition module information and the database address information associated with a matching keyword if such a matching keyword is found.

Then, based on the acquisition module information, the information extracting unit 25' activates the relevant information acquiring unit 30$_i$' corresponding to the keyword. Also, the information extracting unit 25' transmits the image data file name or file address, and the search key information stored in the image data file to the relevant information acquiring unit 30$_i$'.

In response to being activated by the information extracting unit 25', the relevant information acquiring unit 30$_i$' activates the relevant information acquiring module 32' references the relevant information storing module 31 based on the database address received from the information extracting unit 25', searches for data matching the search key information, and acquires relevant personal information from the data matching the search key information.

In the following, process steps according to the third embodiment of the present invention are described with reference to the flowchart shown in FIG. 17.

Figure 17:
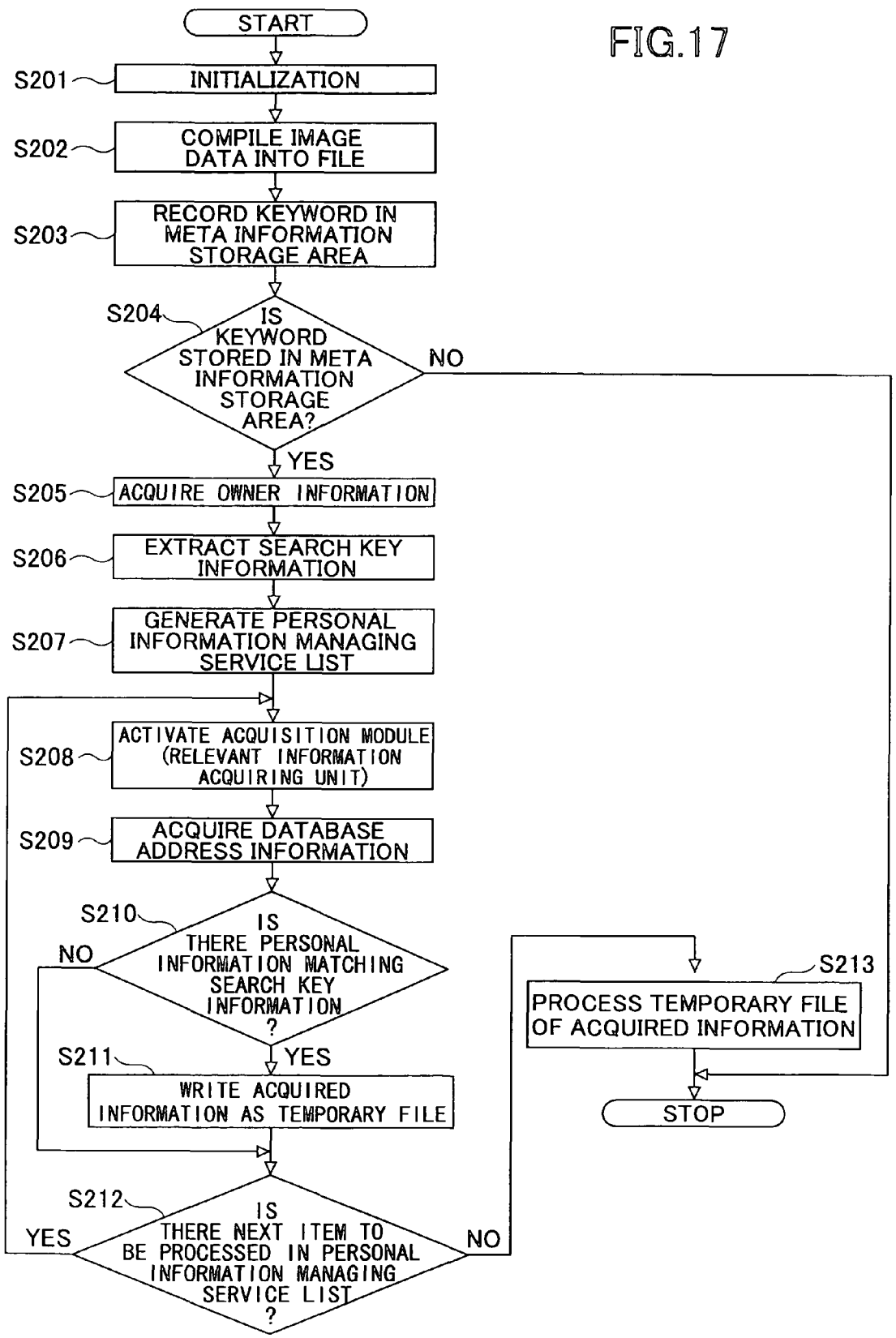
FIG. 17 is a flowchart illustrating process steps to be executed by the information processing apparatus according to the third embodiment.

As is shown in FIG. 17, an initialization process is performed that involves generating an owner information database for each user (owner) that includes keywords T10 that is used to enable the user to designate information to be gathered (i.e., keywords stored in the gathering information storing unit 23), the names (i.e., software module names) T11 of services (relevant information acquiring units 30$_i$') corresponding to the keywords from which relevant personal information is to be obtained, and database address information T2 indicating the addresses of the databases for accessing the personal information managed for each user in the personal information managing services, and storing the generated owner information database in the owner information storage part 6'(step S201).

When a user captures information such as image data as notes, the captured image data are arranged into an image data file within the information processing apparatus to be temporarily stored in the storage part 4 (step S202). Alternatively, a user may designate an image data file of image data that are previously captured as the image data file to be processed using the information managing unit 28' and the input unit 21.

Then, information to be gathered (keyword) that is designated by the user from the owner information stored beforehand is recorded in the meta information storage area of the designated image data file (step S203: realized by the recording command unit 22').

Then, at the relevant information acquisition determining unit 24', a determination is made as to whether information to be gathered (keyword) is stored in the meta information storage area of the designated image data file (step S204). If information to be gathered (keyword) is not stored in the meta information storage area of the designated image data file (step S204, NO), the process is ended.

On the other hand, if information to be gathered (keyword) is stored in the meta information storage area of the designated image data file (step S204, YES), owner information of the user operating the present information processing apparatus is acquired (step S205: realized by referencing the information of the user determining unit 26' via the recording command unit 22'), image capture time/date information (and image capture location information as is necessary or desired) is extracted from the meta information storage area of the image data file as search key information (step S206), the keyword acquired from the meta information storage area and the keyword acquired from the owner information are compared to find a matching keyword, and based on the owner information corresponding to the matching keyword, a personal information managing service list is generated in which image data file name information, search key information, acquisition module information, and database address information are associated with each other and arranged into a list (step S207).

The information to be gathered is stored in the meta information storage area of the image data file by describing each personal information managing service from which relevant personal information is to be gathered in text format as a keyword (e.g., "SCHEDULE", "MAIL", etc.) and recording the keyword in the meta information storage area of the image data file according to a predetermined description rule. The predetermined description rule may involve adding a process executing keyword "Ctxt>" as a prefix to the keywords of the list of keywords, and the prefix may be used to instruct execution of the personal information managing service represented by the keyword to which the prefix is attached, for example.

Then, the information extracting unit 25' extracts an unprocessed list item from the generated personal information managing service list for which relevant personal information is to be gathered, activates a corresponding acquisition service module (software: relevant information acquiring units 30$_i$')(step S208), and acquires corresponding database address information from the list item (step S209). Further, the relevant information acquiring module 32' acquires image capture time/date information of the captured image from the list item as the corresponding key information and determines whether personal information including the acquired key information (image capture time/date information) within its time range is stored in the relevant information storing module 31' (step S210). If such personal information is not included, processing of the present personal information managing service is assumed to be completed, and the process proceeds to step S212 (step S210, NO).

On the other hand, if personal information with a time range covering the image capture time/date information of the captured image is stored in the relevant information storing module 31' (step S210, YES), the reference information generating module 33' acquires relevant information such as the start time, the end time, the subject, and the location of the personal information of the personal information managing service, and writes the acquired relevant information in the storage part 4 as a temporary file of data as is shown in FIG. 15 (step S211).

It is noted that the determination of the relevant personal information ay be performed based on information other than the image capture time/date information. For example, in a case where image capture location information (e.g., GPS information) may be obtained, the image capture location information or map information corresponding to the image capture location information (e.g., the corresponding map information may be searched within the apparatus or via a service provided over a network) may be used to determine whether personal information matching the search key information is included in the personal information managing service. In this case, the image capture location information of the capture image may be compared with the image capture location information described in the personal information to determine whether the image capture location information items match or represent locations within the same building, for example.

When the information extracting unit 25' is notified of the completion of the processing of the relevant information acquiring unit 30$_i$', it refers to the next list item of the personal information managing service list (step S212). If an unprocessed list item is found (step S212, YES), the process goes back to step S208 to perform the process steps of steps S208 through S212 on the personal information managing service on the personal information managing service corresponding to the unprocessed list item, and the processing results are added to the data of the temporary file as is shown in FIG. 15. If an unprocessed list item does not remain in the personal information managing service list (step S212, NO), the acquired relevant information added and temporarily written by the meta information adding unit 27' is reorganized to unify overlapping information and the reorganized relevant information is stored in the meta information storage area of the image data file designated by data as is shown in FIG. 15 obtained from referencing the personal information (step S213).

Alternatively, the acquired relevant personal information (e.g., "subject", "location", "work information", etc.) may be organized to unify overlapping information and a text file according to a predetermined format (e.g., xml format) may be generated so that the relevant information may be stored under a file name that is generated according to a predetermined rule based on the file name of the designated image data file, and this file name may be recorded in the meta information storage area of the image data file as a relevant personal information file.

Figure 18:
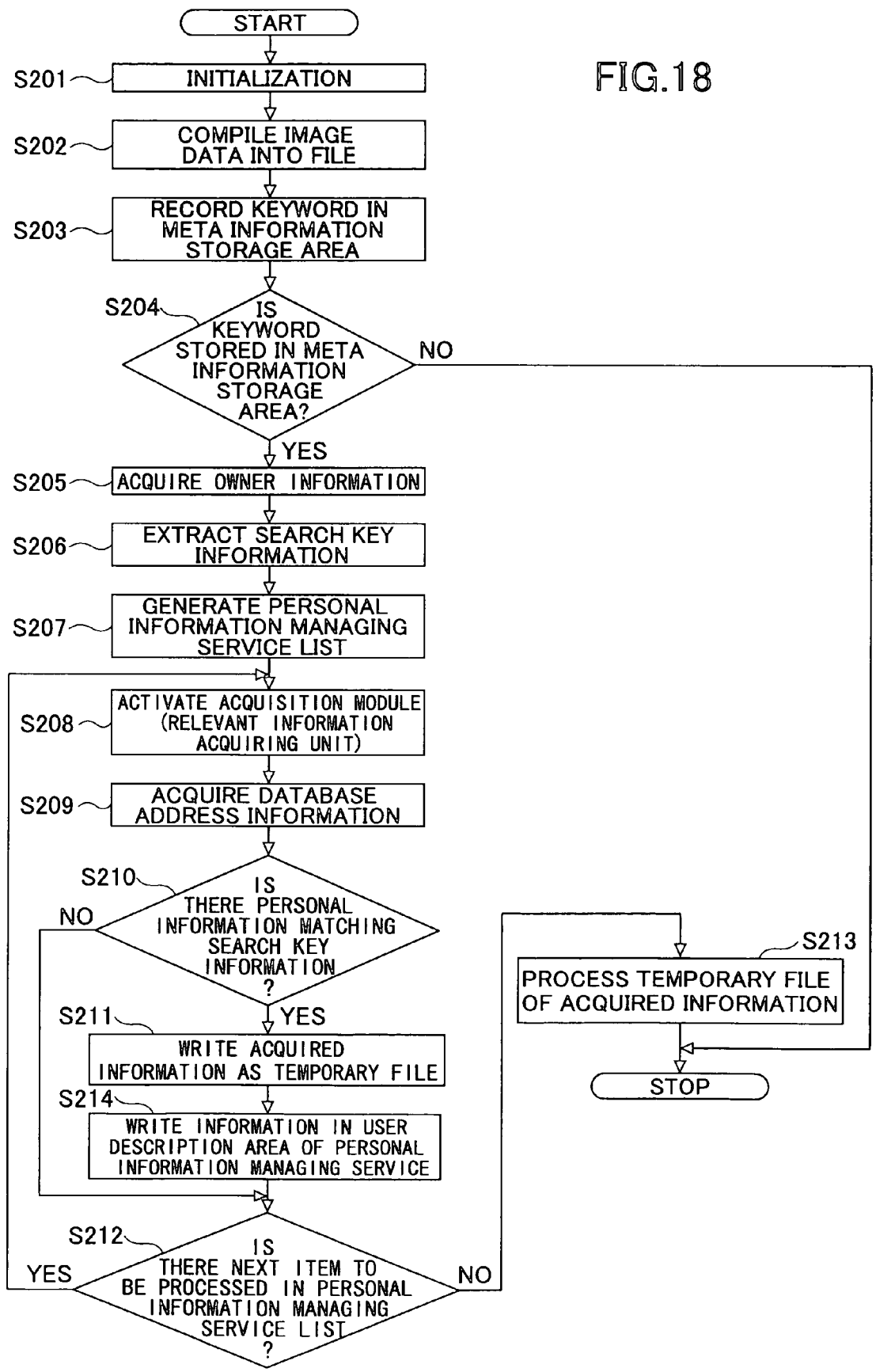
FIG. 18 is another flowchart illustrating process steps to be executed by the information processing apparatus according to the third embodiment.

In another embodiment as is illustrated in FIG. 18 where a personal information managing service has the function of accessing data by a hyperlink (or means for accessing data in this manner is publicly disclosed), when the relevant information acquiring module 32' of the relevant information acquiring unit 30,' acquires personal information matching the key information (step S210, YES), reference information of the final storage destination of the corresponding image data is acquired from the information managing unit 28' via the information extracting unit 25', and the acquired reference information is added to the corresponding personal information as link information that may be recognized by the personal information managing service so that the personal information and the designated image data file may be associated (step S214).

As can be appreciated from the above descriptions, in the case of electronically recording an image or other real world information, gathering information subjects from which relevant personal information is to be gathered are listed (personal information managing service list), and this list is used to acquire relevant personal information or relevant personal information file address information representing the storage location of a relevant personal information file and associate or embed the acquired relevant personal information or personal information file address information with/in the meta information storage area of an image data file so that reuse of image data such as calling an acquired image from a personal information managing service or image searching using personal information may be facilitated.

Other Embodiments

It is noted that in another embodiment, new relevant personal information may be generated based on image data processing results of the image data file.

For example, in the case where personal image information is included in the image data of an image data file, face authentication may be performed to identify an individual, and contact data may be added to the search items to be searched from corresponding personal information so that relevant personal information such as the e-mail address of the individual or the department/group to which the individual belongs may be extracted.

In another example where a two-dimensional bar code is included in image data, information included in the barcode may be decoded, and if information pertaining to a document such as a URL is obtained, such information may be added to the relevant personal information.

<Embodiments of Program and Computer-Readable Medium>

It is noted that embodiments of the present invention also include programs for executing the functions of the information processing apparatus or the information recording system described above and a computer-readable medium storing such programs. For example, the programs stored in the computer-readable medium may be installed in a memory or a storage device of a computer and executed by the computer to realize functions according to embodiments of the present invention. In this way, the programs or the computer-readable medium storing the programs may be regarded as embodiments of the present invention.

Also, functions according to embodiments of the present invention may be realized by an operating system operating based on instructions of the above-described programs or processes enabled by the above-described programs in conjunction with other application programs.

It is noted that programs for executing the functions according to embodiments of the present invention may be stored or embodied in any type of computer-readable medium including but not limited to a disk medium such as a magnetic disk or an optical disk, a card medium such as a memory card or an optical card, a semiconductor memory such as a ROM or a nonvolatile memory, or a tape medium such as a magnetic tape or a cassette tape, for example. In another example, the programs may be stored in a storage device of a server computer that is connected to a network, and the programs may be directly received from the server computer. In this case, the storage device of the server computer may be regarded as a computer-readable medium according to an embodiment of the present invention.

It is noted that embodiments of the present invention in the form of programs or computer-readable media storing such programs may be easily distributed to thereby enable cost reduction and improve portability and versatility, for example.

Although the present invention is shown and described with respect to certain preferred embodiments, it is obvious that equivalents and modifications will occur to others skilled in the art upon reading and understanding the specification. The present invention includes all such equivalents and modifications, and is limited only by the scope of the claims.

The present application is based on and claims the benefit of the earlier filing date of Japanese Patent Application No. 2005-257644 filed on Sep. 6, 2005, the entire contents of which are hereby incorporated by reference. Another Japanese Patent Application No. 2006-238031 filed on Sep. 1, 2006, is hereby incorporated by reference.

What is claimed is:

1. An information processing apparatus that includes a processor and a computer readable medium embedded with software components executable by the processor, the executable software components comprising:

an image data generating unit that acquires image/audio information and generates a data file from the acquired image/audio information, in response to an operations command;

a user information storing unit that stores and manages information for identifying an operator issuing the operations command;

a personal information storing unit that stores and manages personal information of the identified operator;

a gathering information storing unit that manages the stored personal information using personal information managing services, said gathering information storing unit stores key words, each of the stored key words corresponding to a particular personal information managing service;

a recording command unit that selects a personal information managing service, generates a character string representing the selected personal information managing service according to a predetermined description rule, wherein the generated character string comprises at least one stored keyword corresponding to the selected personal information managing service, and inserts the generated character string into a meta information storage area of the generated data file;

an information extracting unit that analyzes the selected personal information managing service and extracts relevant personal information from the stored personal information of the identified operator, and associating at least a portion of the extracted relevant personal information with the generated data file, wherein the relevant personal information is extracted based on the at least one key word of the inserted character string in the meta information storage area and relevant personal information is not extracted for the generated data file if a keyword according to the predetermined description rule does not exist in the meta information storage area.

2. The information processing apparatus as claimed in 1, wherein the gathering information storing unit stores reference information for accessing the personal information managing service.

3. The information processing apparatus as claimed in claim 1, further comprising:

a relevant information generating unit that associates east one portion of the relevant personal information extracted by the information extracting unit with the generated data file.

4. The information processing apparatus as claimed in claim 3, wherein the relevant information generating unit stores said at least one portion of the extracted relevant personal information as relevant recording information, and embeds reference information for accessing the stored relevant recording information in meta information of the generated data file.

5. The information processing apparatus as claimed in claim 3, wherein the relevant information generating unit embeds said at least one portion of the extracted personal relevant information in meta information of the generated data file.

6. The information processing apparatus as claimed in claim 4, further comprising:

ion adding unit that adds the relevant recording information to the generated data file when the relevant personal information is acquired.

7. The information processing apparatus as claimed in claim 4, further comprising:

a meta information erasing unit that erases at least one portion of the meta information when the generated data file is to be distributed.

8. The information processing apparatus as claimed in 1, further comprising:

a relevant information acquiring unit configured to search for personal information of a designated operator; and a relevant information acquisition determining unit that searches the meta information storage area for a prefix preceding the keyword, according to the predetermined description rule, extracts the keyword from the meta information storage area, and transmits the extracted keyword to the information extracting unit, wherein the information extracting unit forwards the keyword received from the relevant information acquisition determining unit, along with designated operator information and search key information, to the relevant information acquiring unit, and the relevant information acquiring unit searches for information matching the search key information in the personal information, stored in the personal information storing unit, of user identified by the designated operator information, and extracts information corresponding to a predetermined item that matches with the search key information, as the relevant personal information, and returns said relevant personal information to the information extracting unit.

9. The information processing apparatus as claimed in 1, wherein the character string inserted in the meta information storage area of the predetermined electronic data includes a predetermined reserved prefix as metadata.

10. An information recording system comprising:

an information processing terminal that acquires image/audio information and generates a data file from the acquired image/audio information, in response to an operations command;

an information processing apparatus that receives the generated data file from the information processing terminal and stores the received data file; and a network that interconnects the information processing terminal and the information processing apparatus; wherein the information processing terminal includes:

a user information storing unit that stores and manages information for identifying an operator issuing the operations command, a gathering information storing unit that manages personal information using personal information managing services, said gathering information storing unit stores key words, each of the stored key words corresponding to a particular personal information managing service, a recording command unit that selects a personal information managing service, generates a character string representing the selected personal information managing service according to a predetermined description rule, wherein the generated character string comprises at least one stored key word corresponding to the selected personal information managing service, and inserts the generated character string into a meta information storage area of the generated data file, and a forwarding unit that transmits the stored information for identifying the operator, the generated data file, and the selected personal information managing service to the information processing apparatus; and the information processing apparatus includes a receiving unit that receives the transmitted information for identifying the operator, the data file, and the personal information managing service from the information processing terminal, a personal information storing unit that stores and manages personal information of the identified operator, and an information extracting unit that analyzes the personal information managing service received from the information processing terminal and acquires relevant personal information from the personal information of the identified operator stored in the personal information storing unit, and associating at least a portion of the extracted relevant personal information with the generated data file, wherein the relevant personal information is extracted based on the at least one key word of the inserted character string in the meta information storage area of the data file received by the receiving unit, and relevant personal information is not extracted for the generated data file if a keyword according to the predetermined description rule does not exist in the meta information storage area.

11. The information recording system as claimed in 10, wherein the gathering information storing unit stores reference information for accessing the personal information managing service.

12. The information recording system as claimed in claim 10, wherein the information processing apparatus further includes a relevant on generating unit that associates at least one portion of the relevant personal information extracted by the information extracting unit with the data file received by the receiving unit.

13. The information recording system as claimed in claim 12, wherein the relevant information generating unit stores said at least one portion of the extracted relevant personal information as relevant recording information, and embeds reference information for accessing the stored relevant recording information in meta information of the data file received by the receiving unit.

14. The information processing apparatus as claimed in claim 12, wherein the relevant information generating unit embeds said at least one portion of the extracted personal relevant information in meta information of the data file received by the receiving unit.

15. The information processing apparatus as claimed in claim 13, wherein the information processing apparatus further includes an information adding unit that adds the relevant recording information to the data file received by the receiving unit when the relevant persona information is acquired.

16. The information processing apparatus as claimed in claim 13, wherein the information processing apparatus further includes a meta information erasing unit that erases at least one portion of the meta information when the data file is to be distributed.

17. A computer-readable medium storing a program of instructions, a computer executing the program of instructions performing the steps of:

(a) acquiring image/audio information and generating a data file from the acquired image/audio information, by an information processing apparatus, in response to an operations command;

(b) storing and managing user information for identifying an operator issuing the operations command and personal information of the identified operator within a personal information managing unit;

(c) managing the stored personal information using personal information managing services, and storing key words, each of the stored key words corresponding to a particular personal information managing service;

(d) selecting a personal information managing service, generating a character string representing the selected personal information managing service according to a predetermined description rule, wherein the generated character string comprises at least one stored key word corresponding to the selected personal information managing service, and inserting the generated character string into a meta information storage area of the generated data file;

(e) analyzing the selected personal information managing service, acquiring relevant personal information from the personal information of the identified operator stored in the personal information storing unit, and associating at least one portion of the acquired relevant personal information with the generated data file; and (f) extracting the relevant personal information, based on the at least one key word of the inserted character string in the meta information storage area, wherein relevant personal information is not extracted for the generated data file if a keyword according to the predetermined description rule does not exist in the meta information storage area.

18. The computer readable medium as claimed in claim 17, wherein when the relevant personal information is acquired, said at least one portion of the acquired relevant personal information is stored in an information managing unit as relevant recording information, and reference information for accessing the stored relevant recording information is added to the information managing unit.

19. An information processing apparatus that includes a processor and a computer readable medium tangibly embodying a program of instructions executable by the processor to acquire image/audio information and generate predetermined electronic data from the acquired information, in response to an operations command, the apparatus including the processor configured by said program of executable instructions comprising:

a user information storing unit that stores and manages information for identifying an operator issuing the operations command;

a personal information storing unit that stores and manages personal information of the operator;

a gathering information storing unit that stores or describes a personal information managing service managing personal information that is subject to processing, said gathering information storing unit storing key words, each of the key words corresponding to the personal information managing service;

a recording command unit that selects the personal information managing service, generates a character string representing the selected personal information managing service according to a predetermined description rule by using the key words, and inserts the character string in a meta information storage area of the predetermined electronic data;

an information extracting unit that analyzes the personal information managing service of the gathering information storing unit and extracts relevant personal information from the personal information of the stored in the personal information storing unit corresponding to the personal information managing service; and a relevant information acquisition determining unit that determines whether a keyword written according to the predetermined description rule is recorded in the meta information storage area of the predetermined electronic data, and if it is determined that the keyword written according to the predetermined description rule is not recorded in the meta information storage area, causes the information extracting unit not to extract the relevant personal information from the personal information stored in the personal information storing unit, wherein if the relevant information acquisition determining unit determines that the keyword written according to the predetermined description rule is recorded in the meta information storage area, the relevant information acquisition determining unit extracts the keyword from the meta information storage area and transmits the extracted keyword to the information extracting unit, and the information extracting unit causes the relevant personal information to be extracted, based at least in part on the keyword received from the relevant information acquisition determining unit, and to be linked to the generated data file.

\* \* \* \* \*